United States Patent
Pepin et al.

(10) Patent No.: US 11,772,702 B2
(45) Date of Patent: Oct. 3, 2023

(54) STEERING KNUCKLE GEARBOX ASSEMBLY

(71) Applicant: SOUCY INTERNATIONAL INC., Drummondville (CA)

(72) Inventors: Pierre-Yves Pepin, Drummondville (CA); Steve Frechette, St-Liboire (CA); Keven Boutin, Trois-Rivieres (CA); Charles St-Arnaud, Trois-Rivieres (CA); Frederik Martel, Laval (CA); Nicolas Dubuc, Mercier (CA); Andre Leger, Drummondville (CA); Pascal Lafreniere, Saint-Cyrille-de-Wendover (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 1090 days.

(21) Appl. No.: 16/639,026

(22) PCT Filed: Aug. 16, 2017

(86) PCT No.: PCT/IB2017/054986
§ 371 (c)(1),
(2) Date: Feb. 13, 2020

(87) PCT Pub. No.: WO2019/034913
PCT Pub. Date: Feb. 21, 2019

(65) Prior Publication Data
US 2020/0223480 A1    Jul. 16, 2020

Related U.S. Application Data

(63) Continuation-in-part of application No. PCT/IB2017/050721, filed on Feb. 9, 2017.
(Continued)

(51) Int. Cl.
*B62D 11/00* (2006.01)
*B62D 7/20* (2006.01)
(Continued)

(52) U.S. Cl.
CPC .............. *B62D 11/001* (2013.01); *B62D 7/18* (2013.01); *B62D 7/20* (2013.01); *B62D 55/24* (2013.01)

(58) Field of Classification Search
CPC .............................. B62D 55/065; B62D 55/01
See application file for complete search history.

(56) References Cited

U.S. PATENT DOCUMENTS 3,283,842 A * 11/1966 Watt .................. B60K 5/02
180/259
4,482,025 A * 11/1984 Ehrlinger ............. B60K 17/046
180/254

(Continued)

FOREIGN PATENT DOCUMENTS

EP        1514775 A1    3/2005
WO    2017137927 A2    8/2017

OTHER PUBLICATIONS

International Search Report from PCT/IB2017/054986, Kulozik Ehrenfried, dated Aug. 5, 2018.

*Primary Examiner* — Minnah L Seoh
*Assistant Examiner* — Maurice L Williams
(74) *Attorney, Agent, or Firm* — BCF LLP

(57) ABSTRACT

A steering knuckle gearbox assembly (138) comprises a body having a housing portion (140) having a cavity defined in the housing portion (140); a mating portion (142) connected to the housing portion (140) and being pivotably mountable an axle frame (106a) of a vehicle; and a mounting portion (144) for having a steering link (90) of the vehicle pivotably mounted to the mounting portion (144). An input shaft (176) is rotationally supported by the housing portion (Continued)

(140) and extends into the cavity at its one end and is operatively connectable to a drive axle (94) of the vehicle at its other end. An output shaft (187) is rotationally supported by the housing portion (140) and extends into the cavity at its one end and is operatively connected to the input shaft (176) at its other end. The output shaft (187) is offset in height from the input shaft (176). A steerable track system for a vehicle is also described.

19 Claims, 23 Drawing Sheets

Related U.S. Application Data

(60) Provisional application No. 62/293,199, filed on Feb. 9, 2016.

(51) Int. Cl.
*B62D 7/18* (2006.01)
*B62D 55/24* (2006.01)

(56) References Cited

U.S. PATENT DOCUMENTS

| | | | | |
|---|---|---|---|---|
| 4,708,363 | A * | 11/1987 | Hata | B62D 7/00 280/771 |
| 4,733,743 | A * | 3/1988 | Weiss | B60K 17/306 180/255 |
| 4,821,834 | A * | 4/1989 | Hueckler | B60K 17/306 280/771 |
| 6,079,512 | A * | 6/2000 | Krisher | B60K 17/306 180/254 |
| 6,176,334 | B1 | 1/2001 | Lorenzen | |
| 6,179,308 | B1 | 1/2001 | Mielauskas et al. | |
| 6,402,169 | B1 | 6/2002 | Schafer et al. | |
| 6,470,991 | B1 | 10/2002 | Bowman et al. | |
| 10,737,721 | B2 * | 8/2020 | Vik | B62D 55/125 |
| 2005/0279563 | A1 | 12/2005 | Peterson | |

* cited by examiner

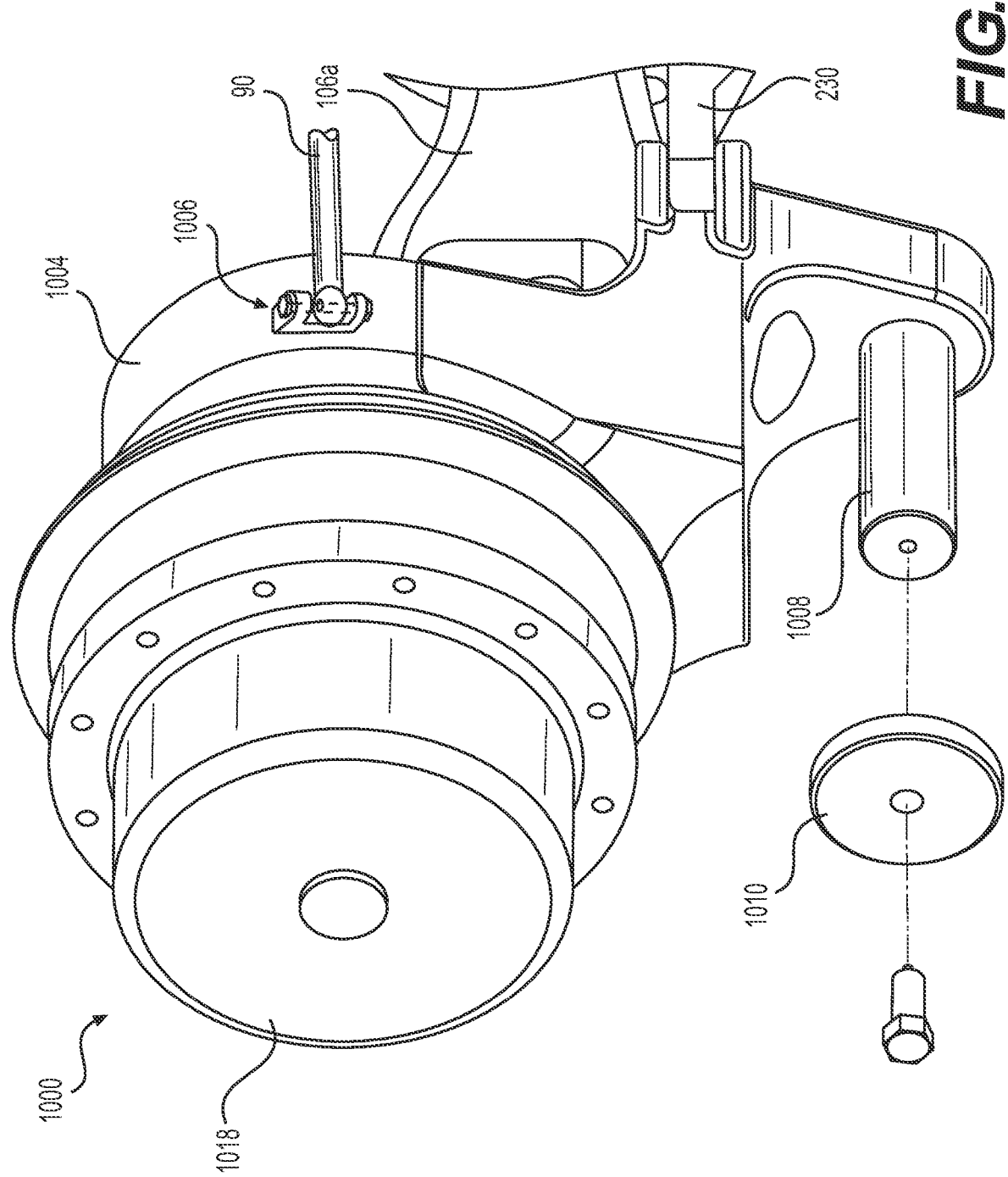

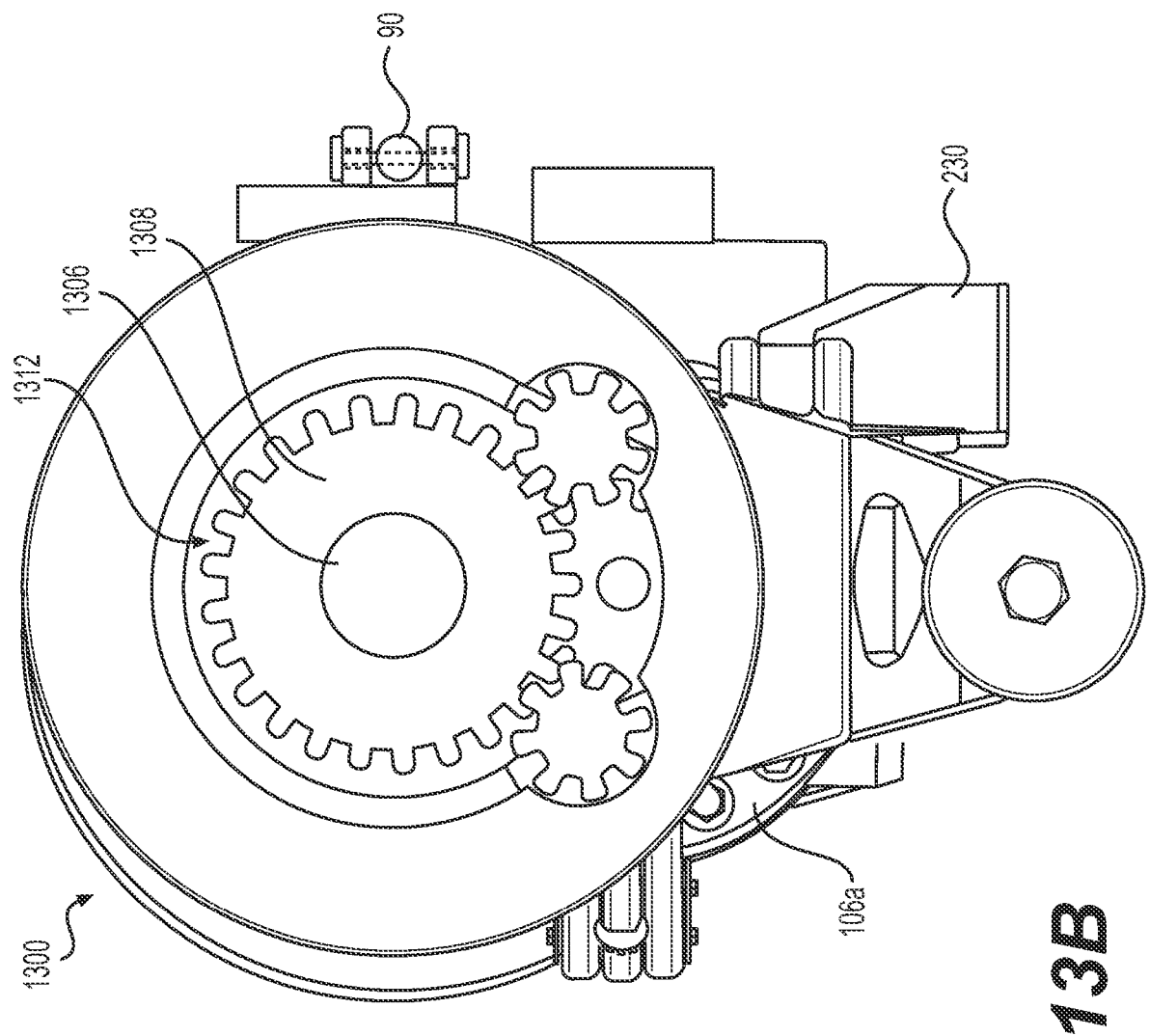

STEERING KNUCKLE GEARBOX ASSEMBLY

PRIORITY

With respect to the designation of the United States of America, the present application is a continuation-in-part of International Patent Application No. PCT/IB2017/050721, filed Feb. 9, 2017, entitled "Steering Knuckle, Steerable Track System, and Vehicle." Through the '721 application, the present application claims priority to U.S. Provisional Patent Application No. 62/293,199 filed Feb. 9, 2016, entitled "Steering Knuckle for a Vehicle Being Offset From Machine Axis". Both of those applications are incorporated herein by reference in their entirety.

TECHNICAL FIELD

The present technology relates to steering knuckle gearbox assemblies and steerable track systems for vehicles incorporating such assemblies.

BACKGROUND

Vehicle track systems are known.

For example, U.S. Patent Publication No. 2012/0242142 A1, published on Sep. 27, 2012, describes a track assembly for providing traction to a vehicle, such as an agricultural vehicle, a construction vehicle, or another work vehicle. The track assembly is mountable to an axle of the vehicle. The track assembly comprises a plurality of wheels comprising a leading idler wheel and a trailing idler wheel spaced apart in a longitudinal direction of the track assembly, an axis of rotation of the axle of the vehicle being located between an axis of rotation of the leading idler wheel and an axis of rotation of the trailing idler wheel in the longitudinal direction of the track assembly, and a driver wheel for rotating when the axle of the vehicle rotates. The track assembly also comprises an endless track disposed around the wheels. The endless track comprises an inner side facing the wheels and a ground-engaging outer side for engaging the ground. The endless track engages the driver wheel such that rotation of the driver wheel imparts motion to the endless track.

The track system described above mounts onto an axle of the vehicle and has transmission components for transferring driving forces from the axle to the endless track of the track system. The track system is structured such that, when mounted onto the axle, a material part of the weight of the vehicle supported by the track system is transferred into the track system via the axle onto which the track system is mounted. Consequently, a material part of this weight is borne by the transmission and other components of the track system.

Also, since a material part of the weight of the vehicle supported by the track system is transferred into the track system via the axle onto which the track system is mounted, the axle also transfers other loads that it experiences while the vehicle drives on terrain (such as loads applied by the vehicle to the axle, and consequently to the track system, when the vehicle drives over irregularities in terrain). Accordingly, components of the track system such as the transmission components experience relatively large loads when the vehicle is in use.

Also, the abovementioned track system mounts onto an axle of the vehicle and therefore relies on steering forces being applied to that axle in order to be steered. The axle acts as a lever relative to the track system and applies the steering forces to components of the track system. In another aspect, the abovementioned track system pivots about the axle onto which it is mounted, and therefore requires an anti-rotation device to be mounted between the track system and the vehicle in order to limit pivoting of the track system about the axle.

SUMMARY

Prior art track systems may be suitable for their intended purposes; however, improvements to prior art are always desirable.

In this document, the term "height" means a vertical distance from flat level ground.

In this document, the term "ground speed" means the speed that an element moves along flat level ground.

In this document, the term "axle frame" means a structural member (which is either a single structural member or is made up of two or more sub-members) that is mounted at its (the axle frame's) one end to, or is integral with, a vehicle frame of a vehicle and at its other end supports a ground-engaging assembly. An example of a ground-engaging assembly is a wheel assembly what includes a wheel that supports a part of the vehicle's weight on terrain. Another example of a ground-engaging assembly is a track system that supports a part of the vehicle's weight on terrain.

The figures included with this document are schematic representations of the present technology. That is, the figures show relative positioning and functional aspects of the various components of the present technology, and not necessarily particular geometries or sizes of the various components. Persons skilled in the art will understand, based on the present disclosure, that the various components of the present technology will be sized and shaped appropriately relative to one another based on conventionally known engineering principles and based on each particular application and embodiment of the present technology, to provide for the functionality described herein.

In one aspect, the present technology provides a steering knuckle gearbox assembly for a vehicle, the vehicle having a vehicle frame, a motor supported by the vehicle frame, an axle frame supported by and extending away from the vehicle frame and ending at a distal end, and a drive axle rotationally supported by and extending away from the vehicle frame toward the distal end of the axle frame, the drive axle being operatively connected to the motor to be driven by the motor.

The steering knuckle gearbox assembly includes a body. The body has a housing portion. The housing portion has a cavity defined in the housing portion and an interior vehicle-facing side. A mating portion is connected to the housing portion and positioned on the interior vehicle-facing side of the housing portion. The mating portion is structured, dimensioned and positioned to be pivotably mounted to the distal end of the axle frame so as to pivot about a steering axis between a first angular position and a second angular position. The housing portion also has a mounting portion that is structured, dimensioned and positioned relative to the body of the steering knuckle gearbox assembly such that a steering link of the vehicle is pivotably mountable thereto for actuating pivoting of the body about the steering axis between the first angular position and the second angular position.

An input shaft is rotationally supported by the housing portion for rotation about an input axis defined by the input shaft. The input shaft has an inner end positioned inside the cavity of the housing portion and an outer end opposite the inner end. The outer end of the input shaft is operatively connectable to the drive axle of the vehicle so as to be drivable by the drive axle when the body of the steering knuckle gearbox assembly is in any one of a range of angular positions between the first angular position and the second angular position.

An output shaft is rotationally supported by the housing portion for rotation about an output axis defined by the output shaft. The output axis is offset in height from the input axis. The output shaft has an inner end positioned inside the cavity of the housing portion and an outer end opposite to the inner end of the output shaft. The inner end of the output shaft is operatively connected to the inner end of the input shaft to be driven by the input shaft.

In some embodiments, the mating portion is integral with the housing portion.

In some embodiments, the mating portion is detachably connected to the housing portion.

In some embodiments, the output axis is upwardly offset from the input axis.

In some embodiments, the mating portion has a king pin aperture defined in the mating portion, the king pin aperture being sized to receive a king pin through the king pin aperture for pivotably mounting the mating portion to the distal end of the axle frame.

In some embodiments, the king pin aperture is defined by a pair of apertures positioned concentrically over the steering axis.

In some embodiments, the outer end of the input shaft terminates at a coupler, the coupler is operatively connectable to the drive axle to be driven by the drive axle when the body is in any one of the range of angular positions between the first angular position and the second angular position, and the coupler is positioned relative to the mating portion such that the steering axis passes through the coupler In some embodiments, the inner end of the output shaft is operatively connected to the inner end of the input shaft via a plurality of universal joints.

In some embodiments, the inner end of the input shaft is operatively connected to the inner end of the output shaft via a first plurality of gears to drive the output shaft at a first predetermined gear ratio, and the first plurality of gears is positioned inside the cavity of the housing portion.

In some embodiments, the first plurality of gears includes a plurality of 45-degree bevel gears.

In some embodiments, the first plurality of gears includes a plurality of spur gears.

In some embodiments, the housing portion has an exterior side opposite the interior vehicle-facing side, the steering knuckle gearbox assembly includes a wheel hub operatively connected to the output shaft to be driven by the output shaft, the wheel hub is positioned on the exterior side of the housing portion, and the wheel hub is structured to have a drive wheel mounted thereto.

In some embodiments, the wheel hub defines a cavity in the wheel hub, at least one additional gear is disposed inside the cavity of the wheel hub, the outer end of the output shaft extends into the cavity of the wheel hub, and the at least one additional gear operatively connects the outer end of the output shaft to the wheel hub to drive the wheel hub at a second predetermined gear ratio.

In some embodiments, the at least one additional gear is a plurality of planetary gears.

In some embodiments, the steering knuckle gearbox assembly further includes a pivot axle connected to a bottom side of the body in a first position. The pivot axle defines a frame pivot axis that is parallel to the output axis, and is structured to have a track system frame pivotably mounted thereon to pivot about the frame pivot axis.

In some embodiments, the pivot axle is removably connected to the bottom side of the body and is connectable to the bottom side of the body in at least one additional position. In such embodiments, the additional position is offset from the first position in at least one of a longitudinal direction and a transverse direction.

In another aspect, the present technology provides a steering knuckle gearbox assembly for a vehicle having a vehicle frame, a motor supported by the vehicle frame, and a drive axle rotationally supported by and extending away from the vehicle frame toward the king pin end of the axle frame, the drive axle being operatively connected to the motor to be driven by the motor.

The steering knuckle gearbox assembly has an axle frame having a vehicle end, and a distal end opposite the vehicle end, the vehicle end being fixedly mountable to the vehicle frame. The steering knuckle gearbox assembly also has a body. The body has a housing portion having a cavity defined in the housing portion and having an interior vehicle-facing side. The body also has a mating portion connected to the housing portion. The mating portion is positioned on the interior vehicle-facing side of the housing portion and is pivotably connected to the distal end of the axle frame to pivot about a steering axis between a first angular position and a second angular position. The body also has a mounting portion structured, dimensioned and positioned relative to the body such that a steering link of the vehicle is pivotably mountable thereto for actuating pivoting of the body about the steering axis between the first angular position and the second angular position.

In some applications, left-side and right-side embodiments of this steering knuckle gearbox assembly are used to replace left-side and right-side steerable wheel assemblies of a vehicle, respectively.

The steering knuckle gearbox assembly also includes an input shaft that is rotationally supported by the housing portion for rotation about an input axis defined by the input shaft. The input shaft has an inner end positioned inside the cavity of the housing portion and an outer end opposite the inner end. The outer end of the input shaft is operatively connectable to the drive axle of the vehicle so as to be drivable by the drive axle when the body is in any one of a range of angular positions between the first angular position and the second angular position.

The steering knuckle gearbox assembly also includes an output shaft rotationally supported by the housing portion for rotation about an output axis defined by the output shaft. The output axis is offset in height from the input axis. The output shaft has an inner end positioned inside the cavity of the housing portion and an outer end being opposite to the inner end of the output shaft. The inner end of the output shaft is operatively connected to the inner end of the input shaft to be driven by the input shaft.

In some embodiments, the axle frame of the steering knuckle gearbox assembly has an aperture defined in the axle frame, the aperture extends between the vehicle end and the distal end and is sized to receive the drive axle of the vehicle therethrough when the vehicle end of the axle frame is mounted to the vehicle frame.

In some embodiments, the steering knuckle gearbox assembly also includes a spacer removably attached to the vehicle end of the axle frame. The spacer has a predetermined thickness and is mounted between the vehicle end of the axle frame and the vehicle frame when the vehicle end of the axle frame is mounted to the vehicle frame. In some cases, the thickness of the spacer is selected to provide the vehicle with a predetermined lateral spacing of at least two of the vehicle's tracks.

In some embodiments, the mating portion is integral with the housing portion.

In some embodiments, the mating portion is detachably connected to the housing portion.

In some embodiments, the output axis is upwardly offset from the input axis. In some cases, and particularly where the steering knuckle gearbox assembly is to be used for retrofitting a wheeled vehicle into a tracked vehicle, the upward offset is selected to obtain a desired ride height of the vehicle once it is retrofitted with the steering knuckle gearbox assembly. In some cases, the upward offset is selected to obtain, via the retrofit, a ride height of the vehicle that is substantially the same as the ride height the vehicle had before the retrofit.

In some embodiments, the mating portion has a king pin aperture defined in the mating portion, the king pin aperture being sized to receive a king pin through the king pin aperture for pivotably mounting the mating portion to the distal end of the axle frame.

In some embodiments, the first and second king pin apertures are defined by a pair of apertures positioned concentrically over the steering axis.

In some embodiments, the outer end of the input shaft terminates at a coupler, the coupler is operatively connectable to the drive axle to be driven by the drive axle when the body is in any one of the range of angular positions between the first angular position and the second angular position, and the coupler is positioned relative to the mating portion such that the steering axis passes through the coupler.

In some embodiments, the inner end of the output shaft is operatively connected to the inner end of the input shaft via a plurality of universal joints.

In some embodiments, the inner end of the input shaft is operatively connected to the inner end of the output shaft via a first plurality of gears to drive the output shaft at a first predetermined gear ratio, and the first plurality of gears is positioned inside the cavity of the housing portion.

In some embodiments, the first plurality of gears includes a plurality of 45-degree bevel gears.

In some embodiments, the first plurality of gears includes a plurality of spur gears.

In some embodiments, the housing portion has an exterior side opposite the interior vehicle-facing side, the steering knuckle gearbox assembly includes a wheel hub operatively connected to the output shaft to be driven by the output shaft, the wheel hub is positioned on the exterior side of the housing portion, and the wheel hub is structured to have a drive wheel mounted thereto.

In some embodiments, the wheel hub defines a cavity in the wheel hub, at least one additional gear is disposed inside the cavity of the wheel hub, the outer end of the output shaft extends into the cavity of the wheel hub, and the at least one additional gear operatively connects the outer end of the output shaft to the wheel hub to drive the wheel hub at a second predetermined gear ratio.

In some embodiments, the at least one additional gear is a plurality of planetary gears.

In some embodiments, the steering knuckle gearbox assembly further includes a pivot axle connected to a bottom side of the body in a first position. The pivot axle defines a frame pivot axis that is parallel to the output axis, and is structured to have a track system frame pivotably mounted thereon to pivot about the frame pivot axis.

In some embodiments, the pivot axle is removably connected to the bottom side of the body and is connectable to the bottom side of the body in at least one additional position. In such embodiments, the additional position is offset from the first position in at least one of a longitudinal direction and a transverse direction.

In another aspect, the present technology provides steerable track system for a vehicle, the vehicle having a vehicle frame, a motor supported by the vehicle frame, an axle frame supported by and extending away from the vehicle frame, and a drive axle rotationally supported by and extending away from the vehicle frame toward a distal end of the axle frame, the drive axle being operatively connected to the motor to be driven by the motor.

The steerable track system has a steering knuckle gearbox assembly. The steering knuckle gearbox assembly has a body. The body has a housing portion having a cavity defined in the housing portion. The housing portion has an interior vehicle-facing side and an exterior side opposite the interior vehicle-facing side. The body also has a mating portion connected to the housing portion and positioned on the interior vehicle-facing side of the housing portion. The mating portion is structured, dimensioned and positioned to be pivotably mounted to the distal end of the axle frame so as to pivot about a steering axis between a first angular position and a second angular position. In another aspect, the body also has a mounting portion structured, dimensioned and positioned relative to the body such that a steering link of the vehicle is pivotably mountable thereto for actuating pivoting of the body about the steering axis between the first angular position and the second angular position.

The steering knuckle gearbox assembly of the steerable track system also has an input shaft that is rotationally supported by the housing portion for rotation about an input axis defined by the input shaft. The input shaft has an inner end positioned inside the cavity of the housing portion and an outer end opposite the inner end. The outer end of the input shaft is operatively connectable to the drive axle of the vehicle so as to be drivable by the drive axle when the body is in any one of a range of angular positions between the first angular position and the second angular position.

The steering knuckle gearbox assembly of the steerable track system also has an output shaft rotationally supported by the housing portion for rotation about an output axis defined by the output shaft. The output axis is offset in height from the input axis. The output shaft has an inner end positioned inside the cavity of the housing portion and an outer end opposite to the inner end of the output shaft. The inner end of the output shaft is operatively connected to the inner end of the input shaft to be driven by the input shaft.

The steering knuckle gearbox assembly of the steerable track system also has a pivot axle connected to a bottom side of the body of the steering knuckle gearbox assembly in a first position. The pivot axle defines a frame pivot axis that is parallel to the output axis.

The steerable track system has a track system frame that is pivotably mounted on the pivot axle to pivot about the frame pivot axis. The track system frame is positioned below the body of the steering knuckle gearbox assembly.

The steerable track system also includes a plurality of idler wheels is rotationally supported on the track system frame, a drive wheel positioned on the exterior side of the housing portion, and an endless track. The drive wheel is operatively connected to the output shaft to be driven by the output shaft. The endless track extends around the plurality of idler wheels and the drive wheel and is in driving engagement with the drive wheel to be driven by the drive wheel.

In some embodiments, the steering axis is angled to provide an effective positive caster to the steerable track system.

In some embodiments, the pivot axle is removably connected to the bottom side of the body of the steering knuckle gearbox assembly and is connectable to the bottom side of the body in at least one additional position. In such embodiments, the additional position is offset from the first position in at least one of a longitudinal direction and a transverse direction.

In some embodiments, the output axis is upwardly offset from the input axis.

In some embodiments, the drive wheel is operatively connected to the input shaft via the output shaft and a plurality of gears so as to be driven by the input shaft via the output shaft and the plurality of gears at a predetermined gear ratio, the predetermined gear ratio is a ratio of rotational speed of the input shaft to rotational speed of the drive wheel, and the plurality of gears is positioned inside the cavity of the housing portion.

In some embodiments, the drive wheel is a drive sprocket.

In summary, the present technology provides a steering knuckle gearbox assembly. One use of the present technology is in new vehicle manufacture (manufacturing new vehicles with the present technology). Another use of the present technology is enabling retrofit of a wheeled vehicle into a tracked vehicle without materially increasing the vehicle's ride height. In some cases, the present technology allows to reduce a vehicle's ride height when retrofitting the vehicle with at least two track systems of the present technology.

In some cases, the present technology allows to modify the vehicle's ride height by, for example, lowering or raising one of the front or the rear of the vehicle but not the other one of the front or the rear of the vehicle. In yet another aspect, the present technology allows a vehicle to be fitted with relatively smaller drive wheels without materially affecting the top ground speed capabilities of the vehicle. In some cases, this allows the present technology to be used on relatively smaller vehicles.

Additional and/or alternative features, aspects, and advantages of embodiments of the present technology will become apparent from the following description, the accompanying drawings, and the appended claims.

BRIEF DESCRIPTION OF THE DRAWINGS

The drawings included herewith are for illustrating various embodiments of articles, products, methods, and apparatuses described in the present specification. The drawings are not to scale. Some features shown in the drawings are exaggerated, scaled down, or otherwise altered relative to their possible "life" size(s) and proportions in order to make the features more clearly visible and to aid the skilled reader in understanding the present technology.

In the drawings:

FIG. 10D is a perspective, partial, schematic assembly view of the front-right track system of the vehicle of FIG. 10A, taken from a front, right side of the front-right track system of the vehicle of FIG. 10A, with some parts removed for clarity;

FIG. 13B is a right side elevation, partial schematic sectional view, of the front-right track system of FIG. 13A, with some parts removed for clarity, showing gears in a housing portion of a steering knuckle gearbox assembly of the front-right track system of FIG. 13A;

DETAILED DESCRIPTION

Figure 1:
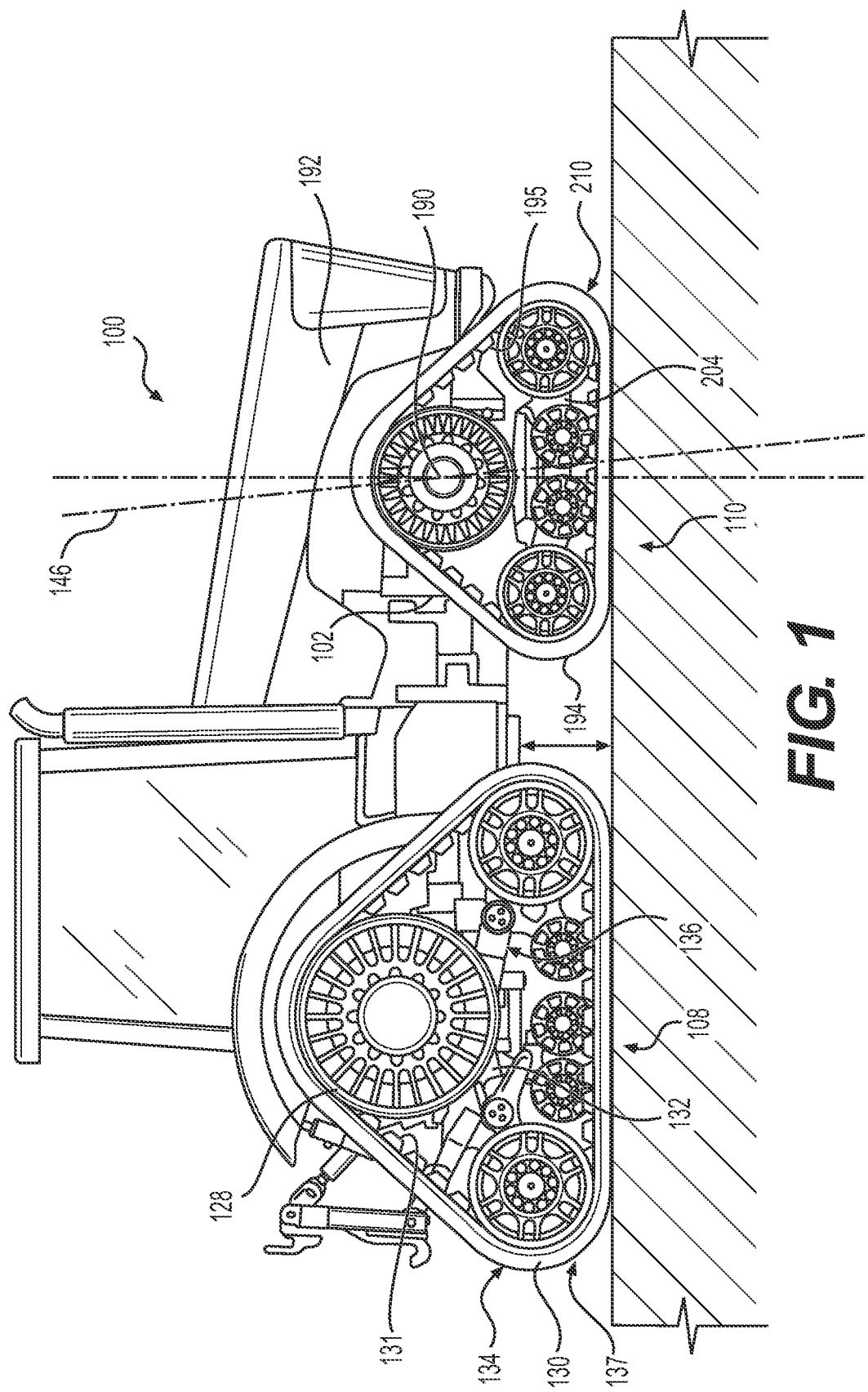
FIG. 1 is a schematic elevation view of a right side of a vehicle, the vehicle having a rear track system according to a first embodiment of the rear track system, and a front track system according to a first embodiment of the front track system.
Figure 2:
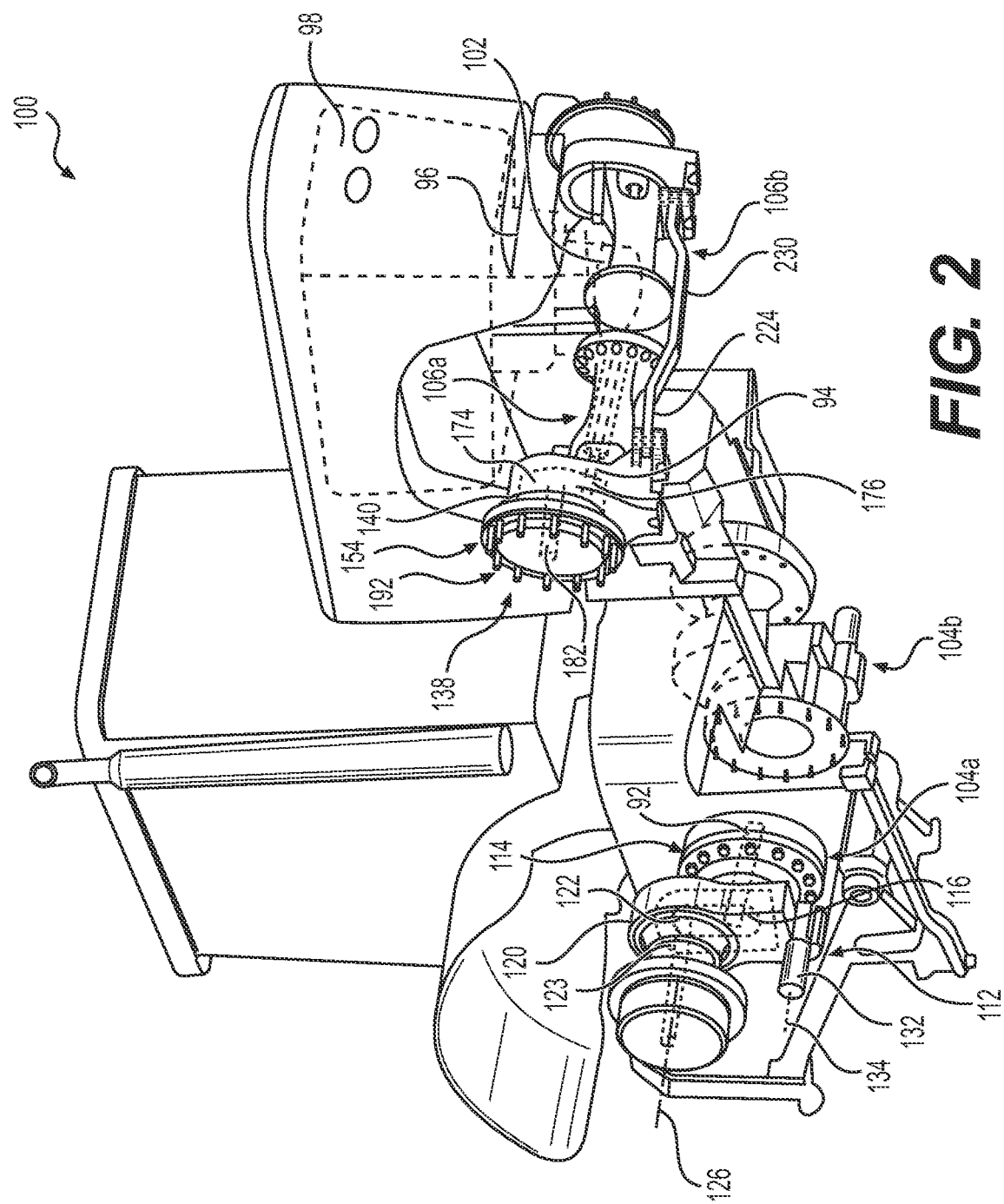
FIG. 2 is a partially transparent, schematic perspective view of the vehicle of FIG. 1, taken from a front, right, bottom side of the vehicle, with some parts of the front and rear track systems removed.

As shown in FIGS. 1 and 2, a vehicle 100 is shown. The vehicle 100 is a tractor that has a vehicle frame 102, four track systems supported by the vehicle frame 102, a steering system for steering the front track systems, a motor (not shown) supported by the vehicle frame 102, and four drive axles operatively connecting the motor to the four track systems for driving the four track systems for propelling the vehicle 100.

The steering system of the vehicle 100 is a hydraulic steering system, and includes a steering wheel (not shown), a front-left steering link (not shown), and a front-right steering link 90. The steering system is a conventionally known steering system. The front-right steering link 90 is positioned in front of the front-right axle frame 106a (described in more detail below) of the vehicle 100. The front-left steering link is a mirror image of the front-right steering link 90 (FIGS. 3A and 7), and is therefore not described in detail herein. In other vehicles, the front-right steering link 90 (and therefore also the front-left steering link) is positioned behind the front-right axle frame 106a. The steering links of the vehicle 100 are operable by a driver turning the steering wheel to thereby steer the front track systems of the vehicle 100.

In another aspect, and as best shown in FIG. 2, the steering system also includes a stabilization bar 230 that interconnects the front-right track system 110 with the front-left track system and maintains the front-right track system 110 parallel to the front-left track system during steering. However, the present technology may be employed with vehicles having a steering system that has a different stabilization bar, or a steering system that excludes the stabilization bar 230.

The four drive axles of the vehicle include two front drive axles and two rear drive axles. All four drive axles of the vehicle 100 are rotationally supported by the vehicle frame 102. The front drive axles are mirror images of each other. The rear drive axles are mirror images of each other. Therefore, to maintain clarity, only the rear-right drive axle 92 and the front-right drive axle 94 are shown (schematically) and described herein in detail.

The four drive axles operatively connect the motor 98 to corresponding ones of the four track systems via a conventionally known transmission 96 (shown schematically, in part, in FIG. 2), to drive the four track systems. It is contemplated that other vehicles, with which the present technology could be used, could have only two drive axles and only two driven track systems. For example, some vehicles could have only front drive axles. As another example, some vehicles could have only rear drive axles.

In another aspect, and as best shown in FIG. 2, the vehicle 100 has four axle frames 104a, 104b, 106a, 106b supported by and extending away from the vehicle frame 102. The rear axle frames 104a, 104b are mirror images of each other. The front axle frames 106a, 106b are mirror images of each other. Therefore, to maintain clarity, only the right-side axle frames 104a, 106a are described herein in detail.

Figure 5A:
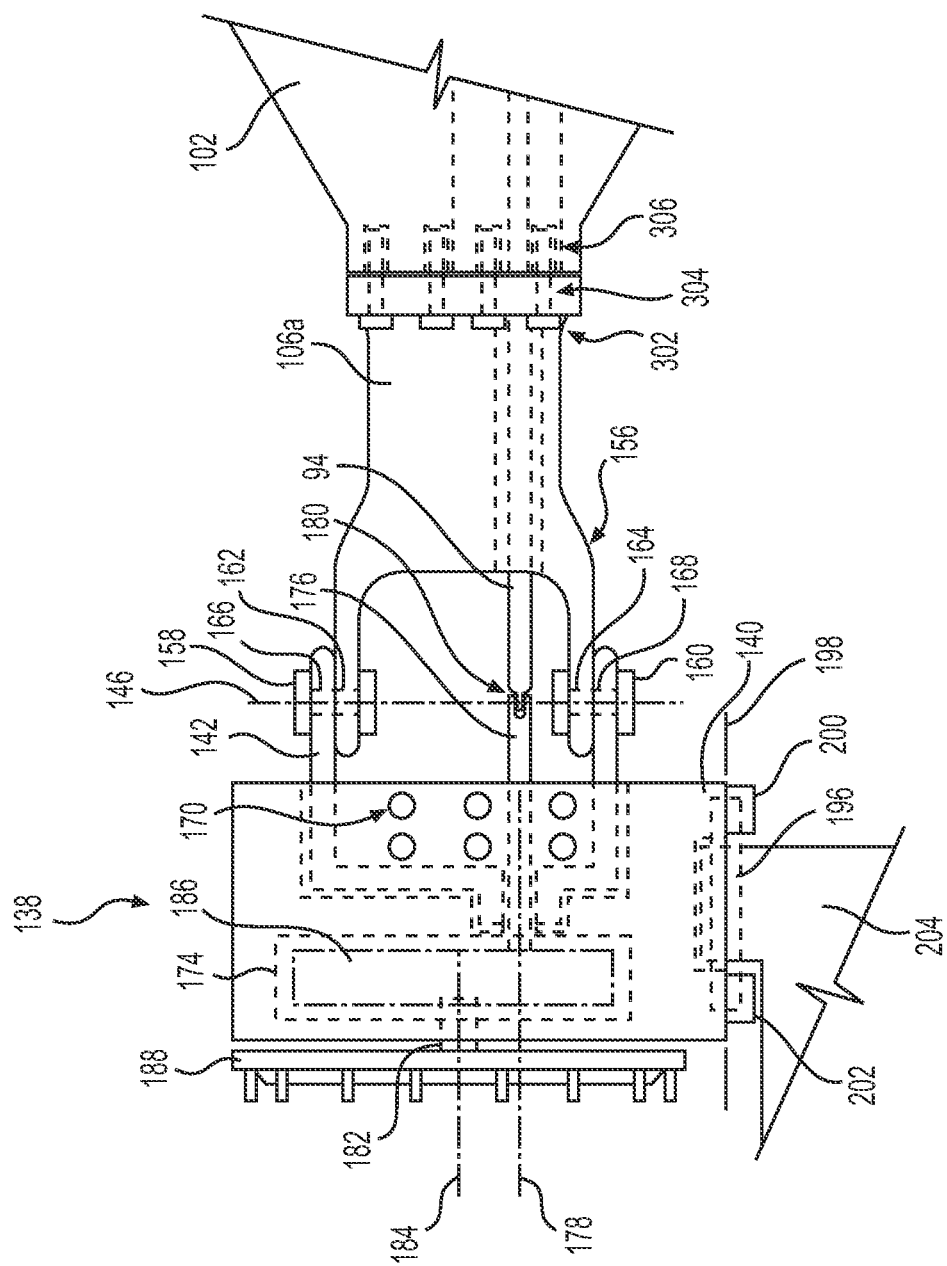
FIG. 5A is a schematic front elevation view of the front-right track system of the vehicle of FIG. 1, with some parts removed for clarity.

As best shown in FIGS. 2 and 5A, the right-side axle frames 104a, 106a are elongate structural members that are made of steel in this embodiment. The rear-right axle frame 104a is a single structural member. The front-right axle frame 106a is also a single structural member. In some embodiments, the front-right axle frame 106a is made up of two or more structural sub-members. In one particular example the front-right axle frame 106a is made up of two structural sub-members, one of which is a steel spacer 220 used to adjust the spacing between the front tracks of the vehicle 100.

Figure 16:
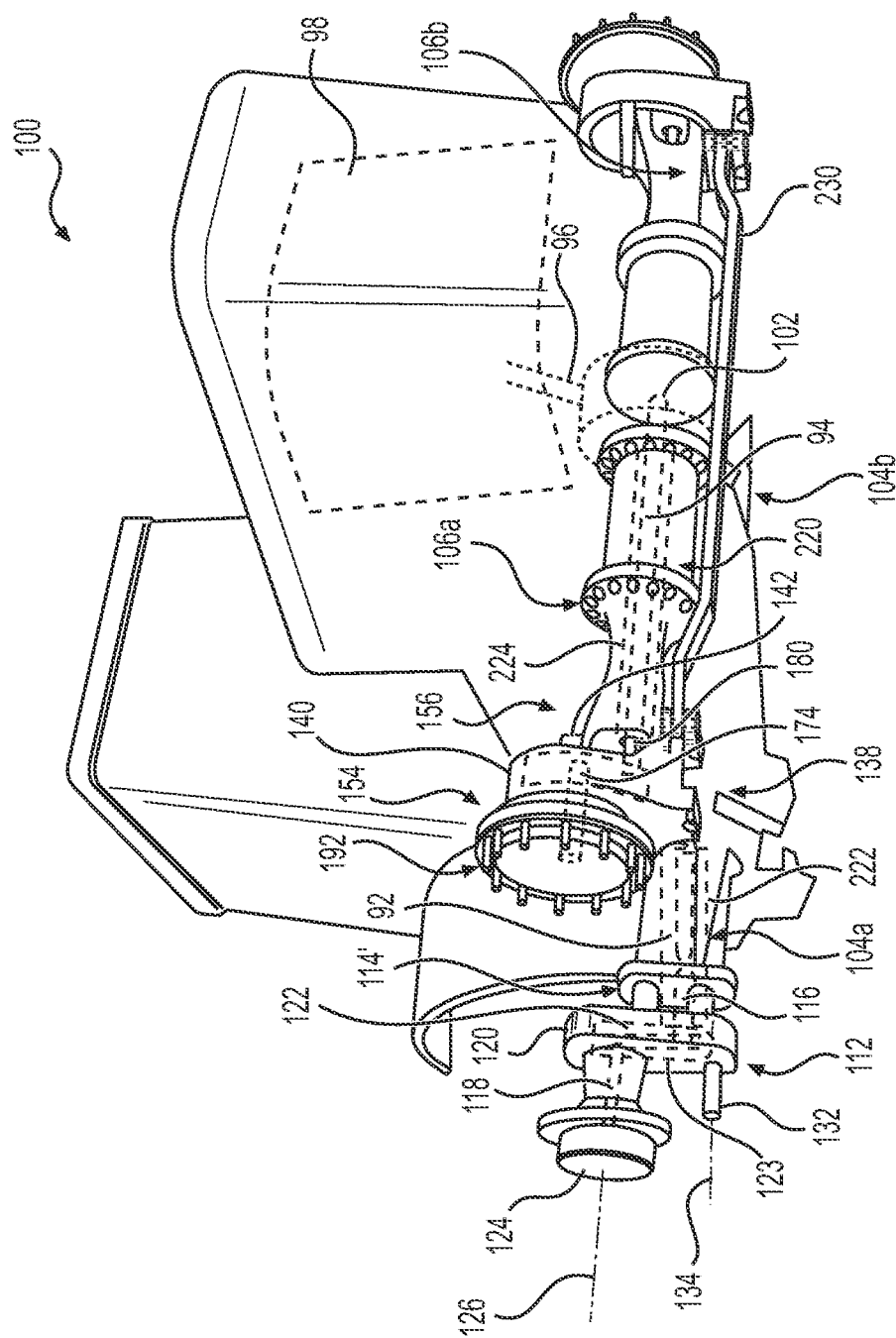
FIG. 16 is a partially transparent, schematic perspective view of the vehicle of FIG. 1, taken from a front, right, bottom side of the vehicle, with some parts removed for clarity, each of the front axle frames of the vehicle including a spacer.

An example of this alternative front-right axle frame 106a is shown in FIG. 16. The spacer 220 has a length that is selected to provide the vehicle 100 with a predefined lateral spacing between the front tracks of the vehicle 100. The spacer 220 has an axle frame end and a vehicle frame end opposite the axle frame end. As shown, the axle frame end of the spacer 220 is fixedly mounted to one end of the axle frame 106a via a first plurality of bolts and nuts. It is contemplated that any other fixed mounting method could be used. The vehicle frame end of the spacer 220 is fixedly mounted to the vehicle frame 102 via a plurality of bolts threaded into a matching plurality of threaded apertures 306 in the vehicle frame 102. It is contemplated that any other fixed mounting method could be used.

The spacer 220 includes a drive shaft aperture (shown schematically in FIG. 16) that extends between the axle frame end and the vehicle frame end of the spacer 220. The drive axle 94 is received through the drive shaft aperture of the spacer 220 and in the drive axle 106a. The drive axle 94 is therefore made longer (than when the vehicle 100 is used without the spacers of the present technology) to accommodate for the added length of the spacer 220. Therefore, when the vehicle 100 is implemented with the embodiment of the front-right axle frame 106a that includes the spacer 220 (and therefore also with the embodiment of the front-left axle frame 106b that includes a mirror image of the spacer 220), the front track systems of the vehicle 100 are spaced farther apart from each other than when the vehicle 100 is implemented with front axle frames 106a and 106b without the spacers of the present technology.

In some applications, the track systems of the present technology are used to replace the rear wheels of the vehicle 100, in addition to or instead of replacing the front wheels of the vehicle 100. In some such applications, the spacers of the present technology are used to provide a desired lateral spacing of the rear tracks of the vehicle. In some such applications, the spacers of the present technology are used to provide a larger lateral spacing between the front tracks of the vehicle than the lateral spacing between the front wheels replaced by the front track systems.

In some applications, the spacers of the present technology are omitted. In some applications, the spacers of the present technology could be selectively added or removed for a given vehicle, when the application of the given vehicle changes. In such cases, the lengths of the drive axles, stabilization bar (if one is present), and the steering links of the given vehicle are changed to work with the particular spacers used with the given vehicle.

Figure 5B:
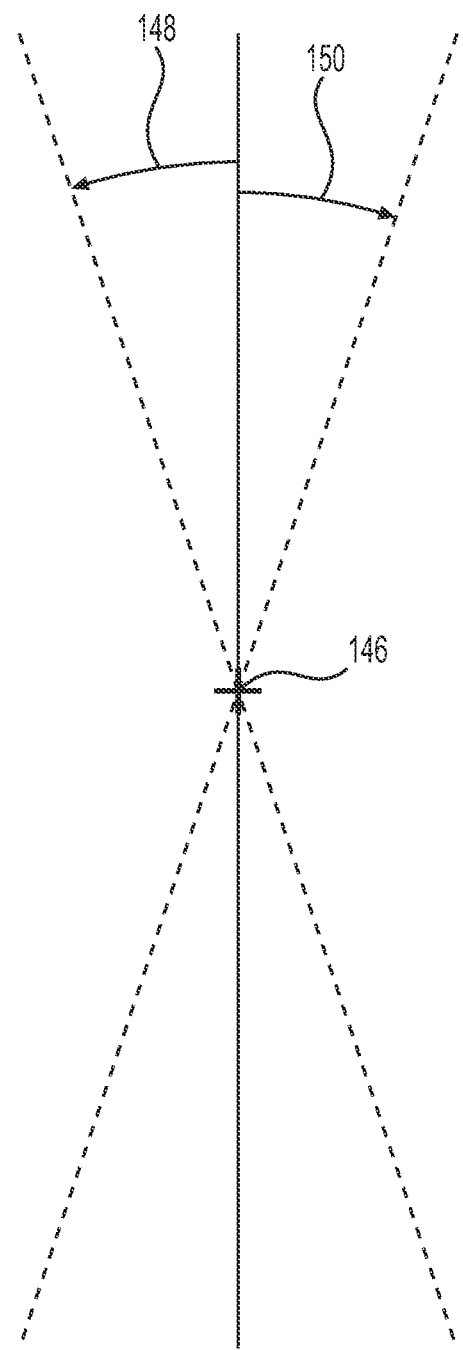
FIG. 5B is a schematic top plan view of a leftward steering position and a rightward steering position of the front-right track system of the vehicle of FIG. 1 about a steering axis of the front-right track system of the vehicle of FIG. 1.

In the present embodiment, each of the right-side axle frames 104a, 106a is mounted at one end to the vehicle frame 102. In the present embodiment, and as best shown in FIG. 2, this is done via a plurality of bolts received through apertures defined in a portion of each of the axle frames 104a, 106a. The bolts are threaded into corresponding threaded apertures defined in the vehicle frame 102. This mounting mechanism (bolts 302, apertures 304 defined in the axle frame 106a, and corresponding apertures 306 defined in the vehicle frame 102) for the axle frame 106a is best shown (schematically) in FIG. 5. The mounting mechanism for the axle frame 104a is the same as the mounting mechanism for the axle frame 106a. It is contemplated that the axle frames 104a, 106a could be mounted to the vehicle frame 102 via any other suitable mounting mechanism.

Referring now to FIGS. 2 and 5, each of the axle frames 104a, 106a has an aperture 222, 224 defined through its length and a corresponding one of the drive axles 92, 94 extends through that aperture 222, 224, respectively. As will be described in more detail below, each of the drive axles 92, 94 extends out of a corresponding one of the axle frames 104a, 106a and is connected to a corresponding one of the track systems 108, 110 for driving the corresponding one of the track systems 108, 110.

The rear-right track system 108 of the vehicle 100 is supported on the rear-right axle frame 104a. The rear-left track system (not shown) is supported on the rear-left axle frame 104b and is a mirror image of the rear-right track system 108. The front-right track system 110 is supported on the front-right axle frame 106a. The front-left track system is supported on the front-left axle frame 106b. In the present embodiment, the front-left track system is a mirror image of the front-right track system 110. In view of this, only the right-side track systems 108, 110 are described herein in detail. It should be noted that, the left-side track systems are shown by inference, since, in the present embodiment, the left side of the vehicle 100 is a mirror image of the right side of the vehicle 100 (that is, FIG. 1 shows the left side of the vehicle, and the left-side track systems by inference).

Rear-Right Track System

In the present embodiment, and as best shown in FIG. 2, the rear-right track system 108 includes a gearbox assembly 112 that has an input shaft 116, an output shaft 118 and a housing portion 120. The housing portion 120 is mounted to a distal end of the rear-right axle frame 104a via a plurality of bolts 114 received through apertures (not shown) in a portion of the housing portion 120. The bolts are threaded into corresponding threaded apertures (not shown) defined in the distal end of the rear-right axle frame 104a.

The housing portion 120 has a cavity 122 defined in the housing portion 120. The input shaft 116 is rotationally supported by the housing portion 120 and at one end extends into the cavity 122. At the input shaft's 116 other end, the input shaft 116 is connected to the rear-right drive axle 92 to be driven (rotated) by the rear-right drive axle 92 (and consequently by the motor 98). The output shaft 118 is also rotationally supported by the housing portion 120 and at one end extends into the cavity 122. In the present embodiment, the output shaft 118 is upwardly offset from the input shaft 116 by a distance selected to provide a desired ground clearance at the rear end of the vehicle 100.

In the present embodiment, a conventionally known gear train 123 is disposed inside the cavity 122. The gear train 123 operatively connects the ends of the input and output shafts 116, 118 in the cavity 122 such that the output shaft 118 is drivable by the input shaft 116 (and consequently by the motor 98) at a predetermined gear ratio. This predetermined gear ratio will further be referred to as the predetermined gear ratio of the track system 108. Selection of the predetermined gear ratio of the track system 108 is described in more detail below.

In this embodiment, the gear train 123 is a conventionally known planetary gear train. In some embodiments, the gear train 123 is a conventionally known bull gear and pinion mechanism. In some embodiments, the gear train 123 includes conventionally known spur gears.

Still referring to FIG. 2, the rear-right track system 108 further includes a wheel hub 124 rotationally supported on an external side of the housing portion 120 to rotate about a wheel hub axis 126. The wheel hub 124 is connected to the output shaft 120 to be driven by the output shaft 120. In the present embodiment, the wheel hub 124 is a metal disk.

As shown in FIG. 1, the track system 108 includes a drive sprocket 128. The drive sprocket 128 is mounted to the wheel hub 114 with bolts (not shown) received through the drive sprocket 128 and threaded into corresponding apertures (not shown) defined in the wheel hub 124, to be driven (rotated) by the wheel hub 124. The drive sprocket 128 is an example of a drive wheel 128 for driving an endless track 130 of the rear-right track system 108.

It is contemplated that the drive sprocket 128 could be any other drive wheel for driving the endless track 130, for example depending on the particular embodiment of the endless track 130 to be used with the track system 108. It is also contemplated that the wheel hub 124 could be a different wheel hub, for example depending on the particular drive wheel 128 of the track system 108.

In another aspect, the track system 108 also includes a pivot axle 132. The pivot axle 132 is mounted to the external side of the housing portion 120 and extends laterally away from the housing portion 120 to define a pivot axis 134. In the present embodiment, the pivot axis 134 is parallel to the wheel hub axis 126. In the present embodiment, the pivot axle 132 is a metal shaft 132 that is integral with the housing portion 120.

In other embodiments, the pivot axle 132 is removably connected to the external side of the housing portion 120 using other mechanisms, such as fasteners. In some such embodiments, the pivot axle 132 is removably connectable to the external side of the housing portion 120 in any one of a plurality of positions that are offset from each other laterally. In some cases, this allows for various adjustments of the track system 108.

In an aspect, the pivot axle 132 transmits at least some of the weight of the vehicle 100 borne by the axle frame 104a to the track system frame 136 (which is described in more detail below) of the track system 108, and thereby reduces at least parts of loads borne by the wheel hub 124. In some applications, the reduction of loads borne by the wheel hub 124 reduces wear of various components of the track system 108. For example, in some embodiments, the reduction of loads borne by the wheel hub 124 reduces wear of at least some components of the gear train 123 of the track system 108.

As mentioned herein above, the track system 108 includes a track system frame 136. The track system frame 136 is pivotably mounted to the pivot axle 132 to pivot about the pivot axis 134. More particularly, the track system frame 136 has an aperture (now shown) defined in the track system frame 136, and the pivot axle 132 is pivotably received and secured in that aperture. In the present embodiment, a conventionally known bearing assembly (not shown) is disposed radially over the pivot axle 132 between the pivot axle 132 and the track system frame 136 to allow for the pivoting motion of the track system frame 136. In other embodiments, other pivot connections are used.

In the present embodiment, the track system frame 136 has a plurality of pivotably interconnected structural members and rotationally supports five idler wheels 137. The structural members of the track system frame 136 are pivotably interconnected using conventionally known mechanisms. In other embodiments, the track system frame 136 has different numbers and configurations of structural members and idler wheels 137. For example, in some embodiments, the track system frame 136 is a single structural element.

The endless track 130 extends around the idler wheels 137 and the drive sprocket 128 of the track system 108. The endless track 130 is a conventionally known track that is in driving engagement with the drive sprocket 128 to be driven by the drive sprocket 128 for propelling the vehicle 100. In the present embodiment, the endless track 130 has drive lugs 131 on an inner side of the track 130 that are received in corresponding apertures in the drive sprocket 128 to be driven by the drive sprocket 128. It is contemplated that the endless track 130 could be any other suitable track (in which case the drive wheel 128 may be different in order to work with the different track 130).

First Embodiment of the Steering Knuckle Gearbox Assembly

The front-right (and therefore also the front-left) track system 110 will now be described in more detail. In the present embodiment, and as best shown in FIGS. 1 to 9, the front-right track system 110 includes a steering knuckle gearbox assembly 138 that is pivotably mounted to a distal end 156 of the front-right axle frame 106*a*. In the present embodiment, the steering knuckle gearbox assembly 138 includes a body 154 that has a housing portion 140, a mating portion 142 connected to the housing portion 140, and a mounting portion 144.

Figure 6:
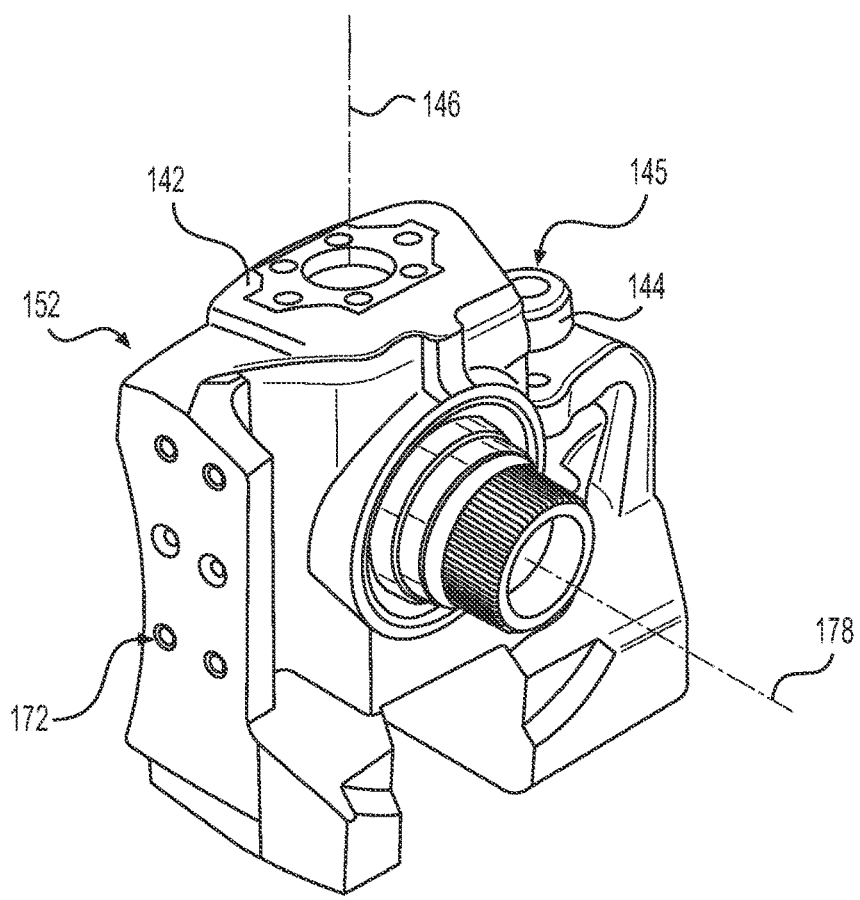
FIG. 6 is a first perspective schematic view of a component of the first embodiment of the front-right track system of the vehicle of FIG. 1.
Figure 7:
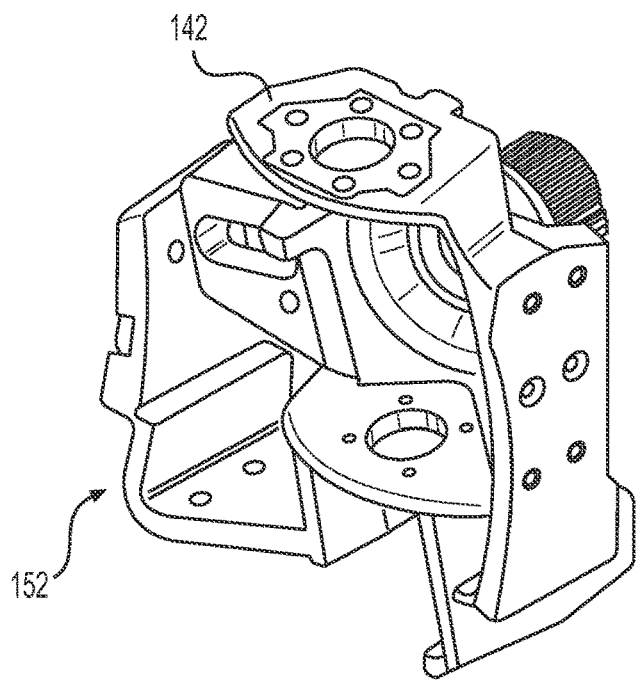
FIG. 7 is a second perspective schematic view of the component of the first embodiment of the front-right track system of the vehicle of FIG. 6.
Figure 8:
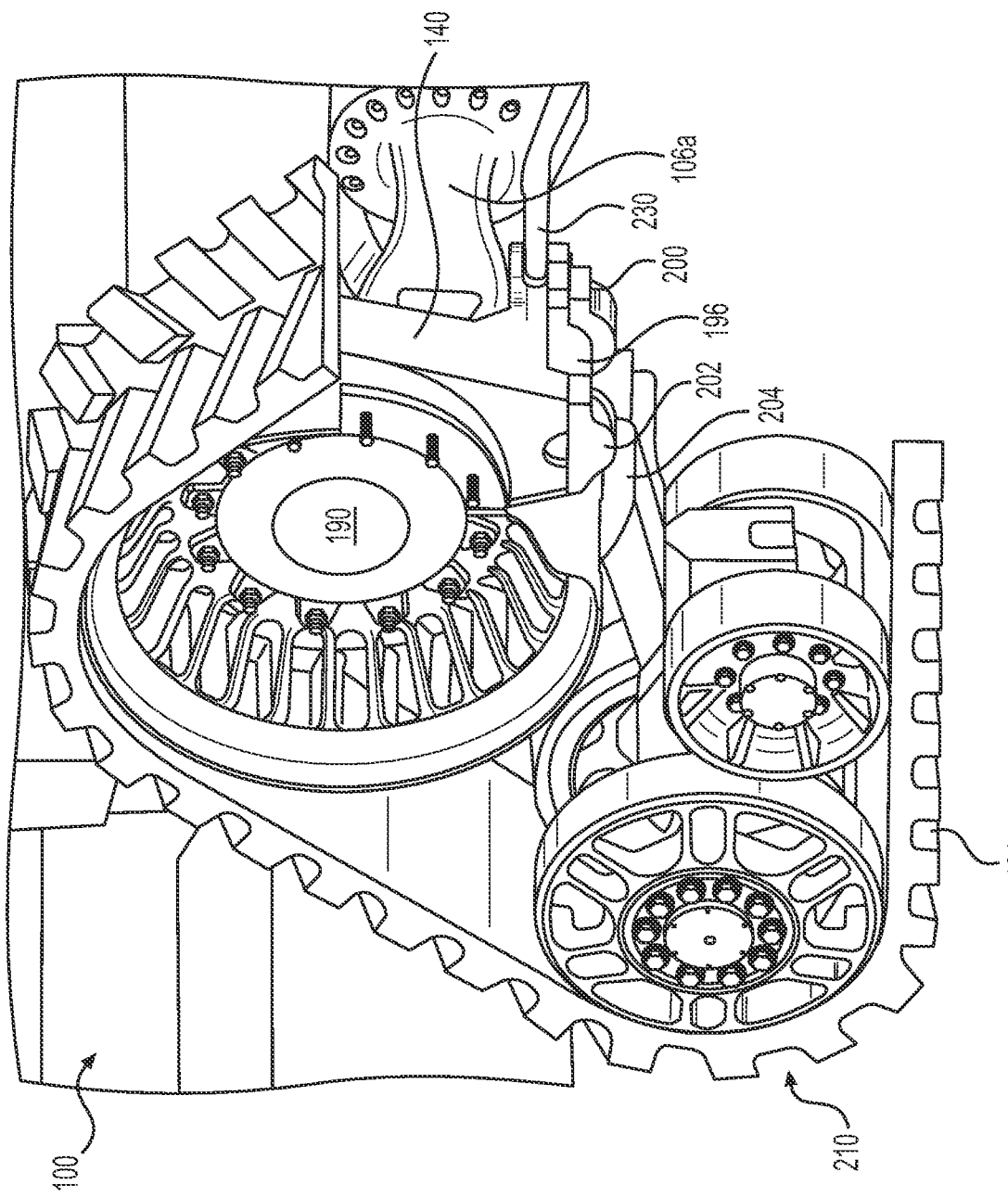
FIG. 8 is a perspective sectional view of the first embodiment of the front-right track system of the vehicle of FIG. 1, taken along an inclined transverse plane passing through the front-right track system, with a steering link removed for clarity.
Figure 9:
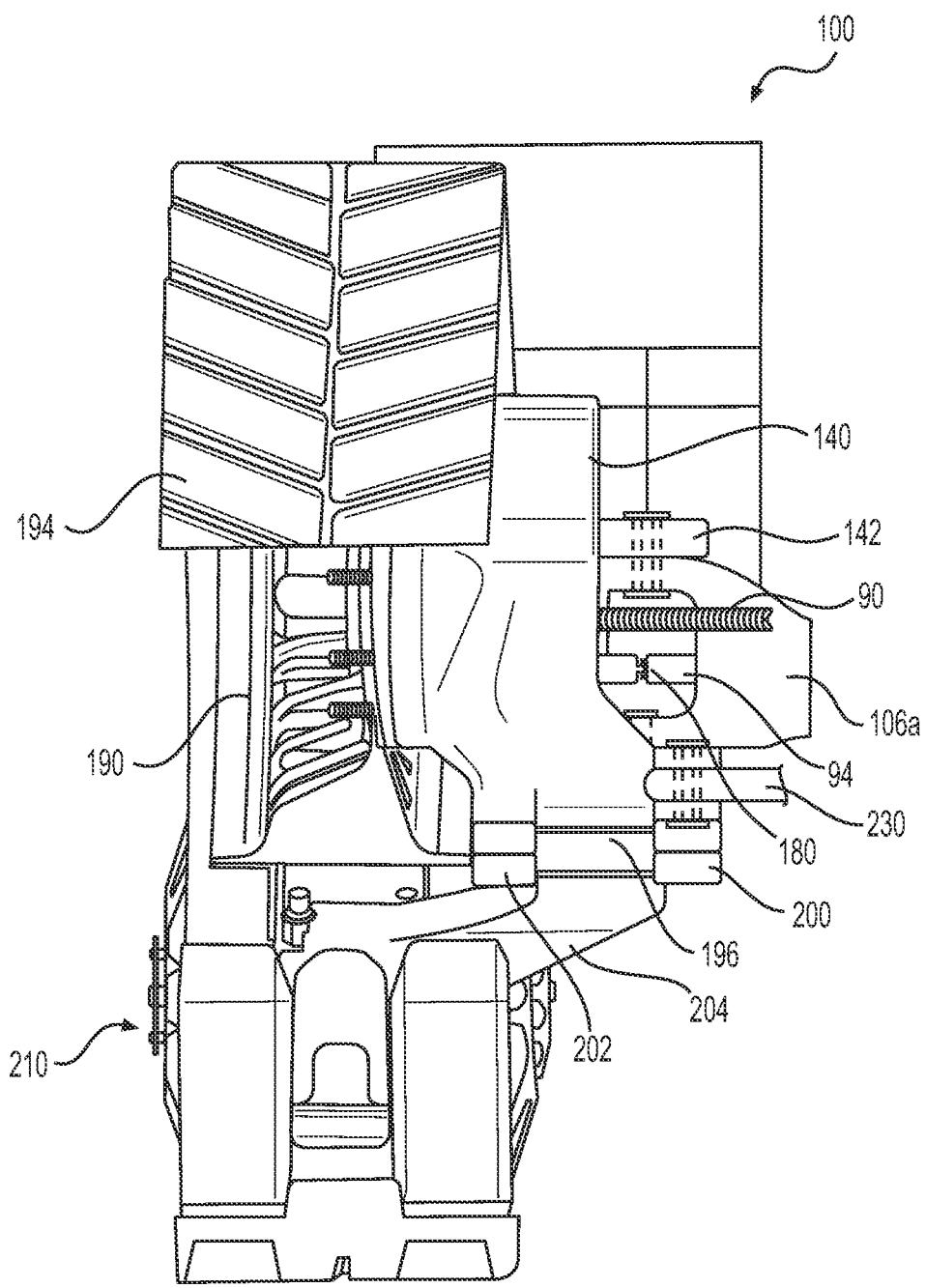
FIG. 9 is a front elevation sectional schematic view of the first embodiment of the front-right track system of the vehicle of FIG. 1, taken along an inclined transverse plane passing through the front-right track system.
Figure 10A:
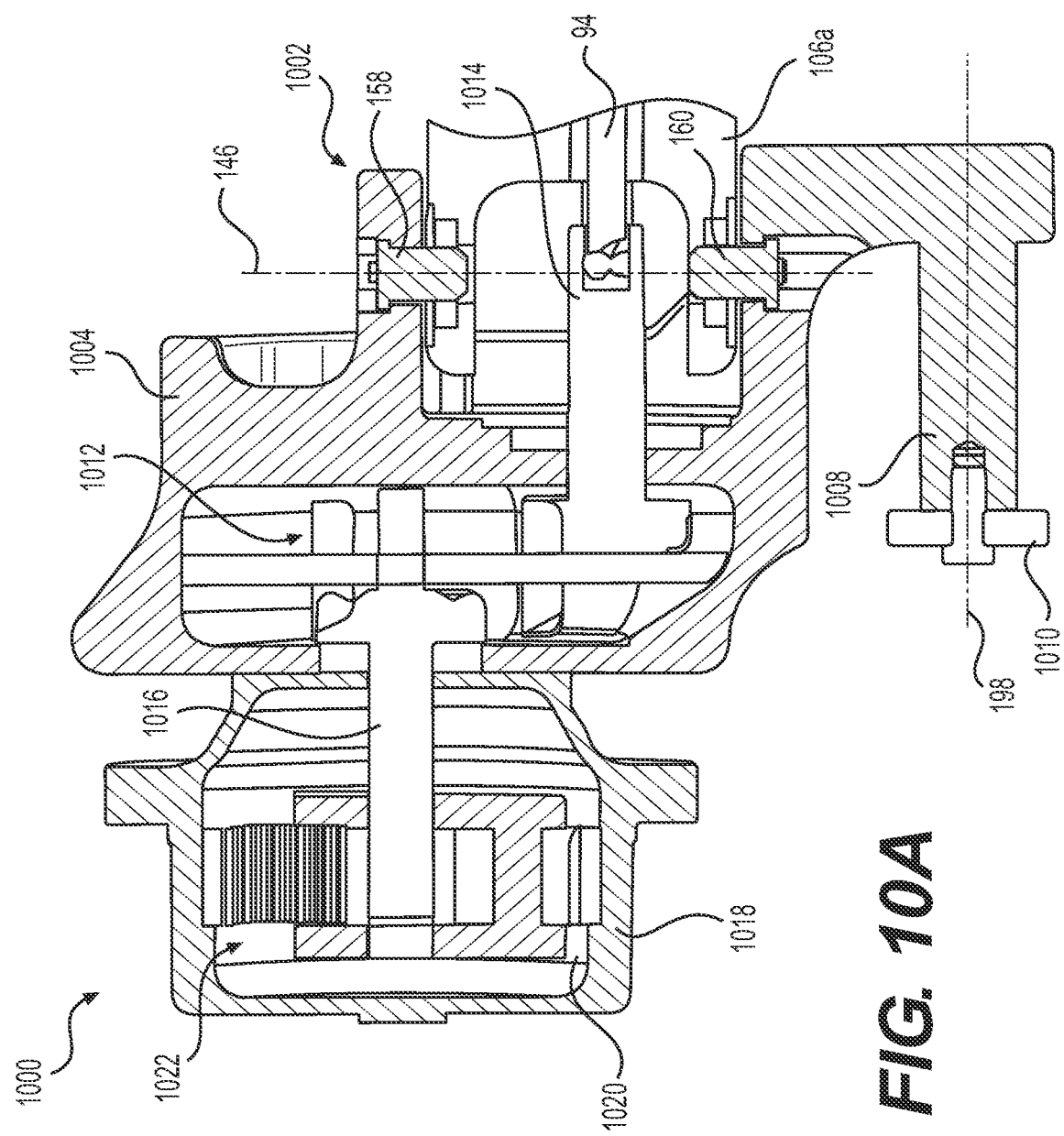
FIG. 10A is a front elevation partial schematic sectional view of a second embodiment of the front-right track system of the vehicle of FIG. 1, with some parts removed for clarity.
Figure 10B:
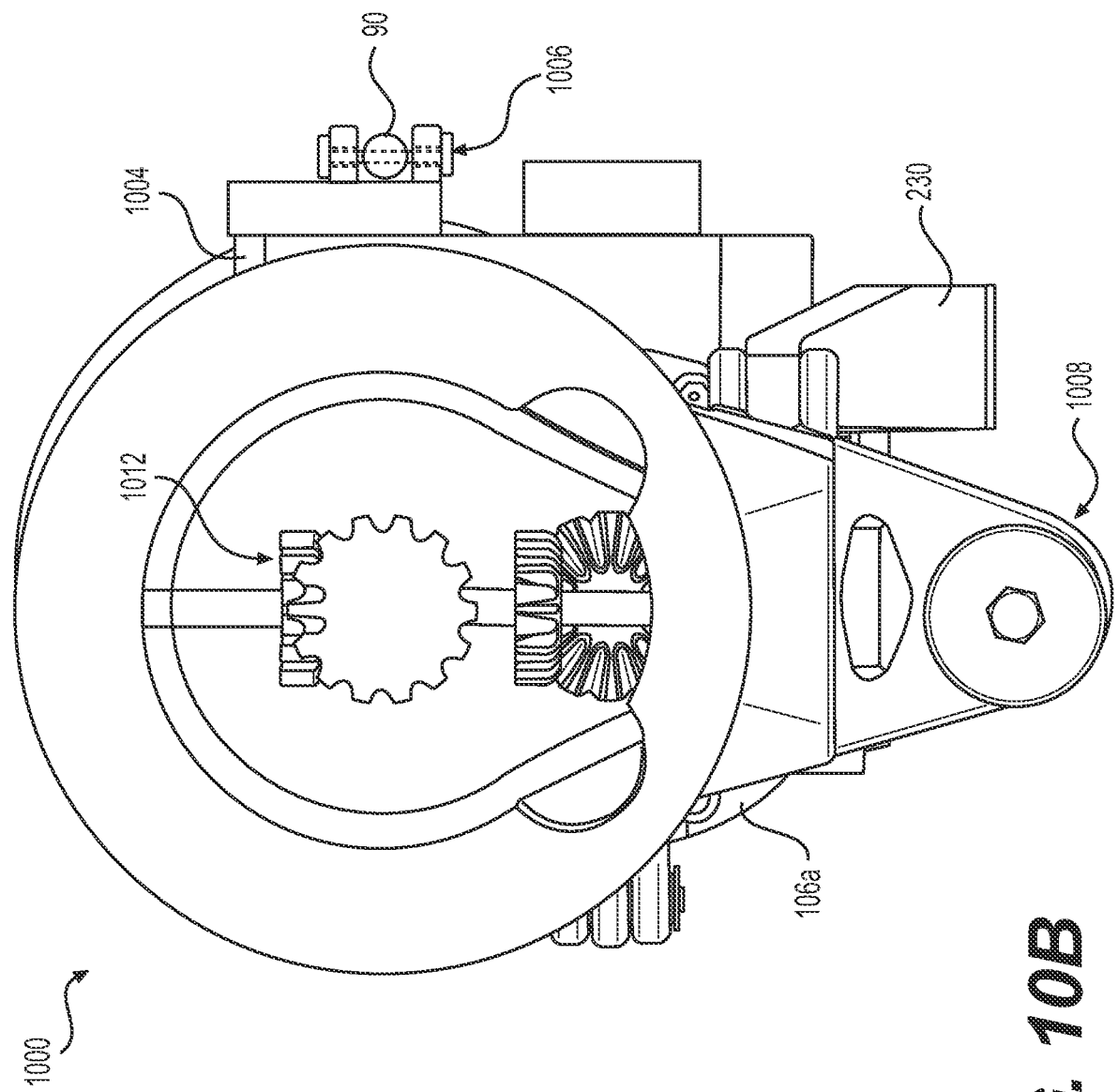
FIG. 10B is a right side elevation, first partial schematic sectional view, of the second embodiment of the front-right track system of FIG. 10A, with some parts removed for clarity, showing gears in a housing portion of a steering knuckle gearbox assembly of the front-right track system of FIG. 10A.
Figure 10C:
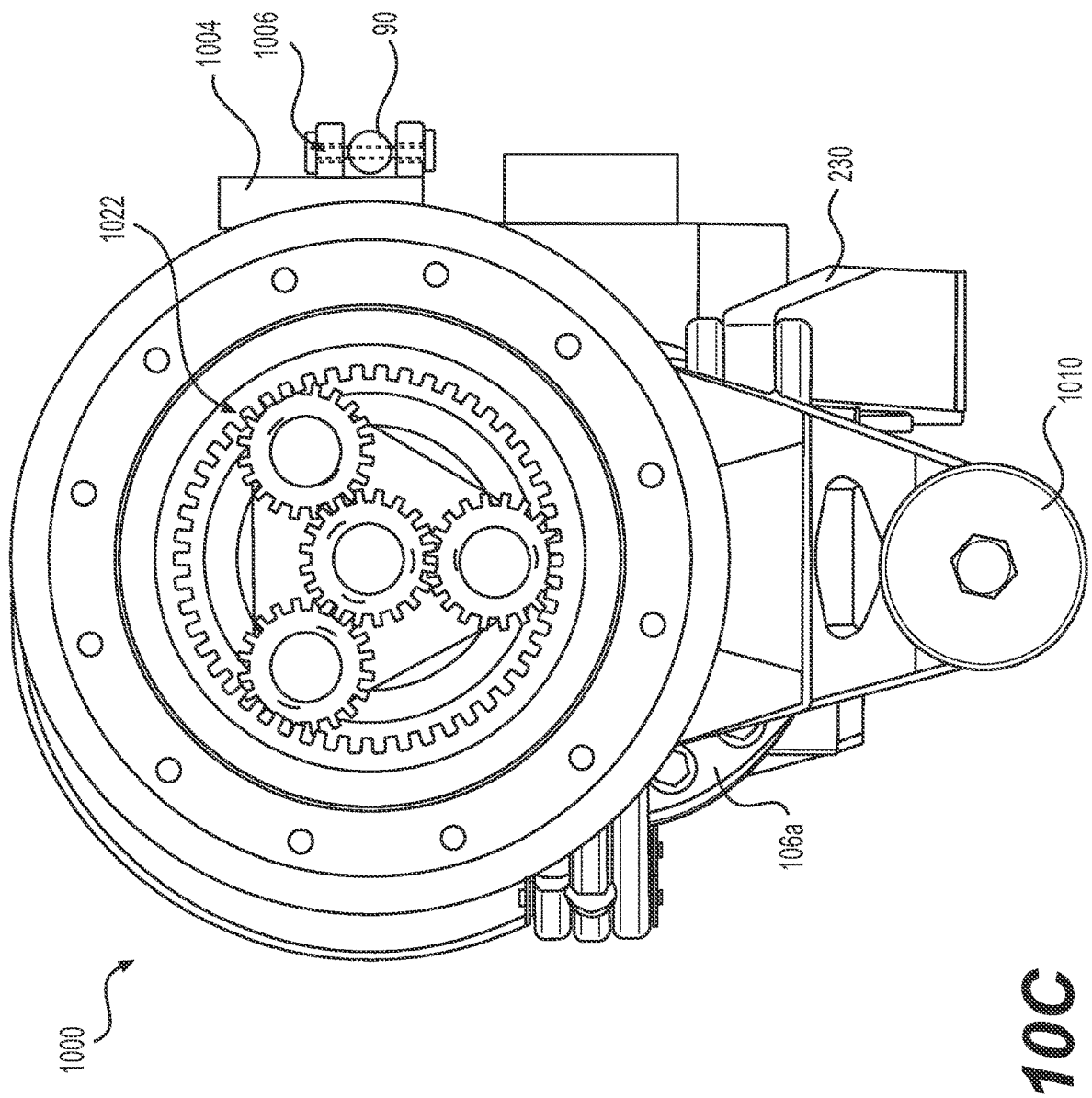
FIG. 10C is a right side elevation, second partial schematic sectional view, of the front-right track system of the vehicle of FIG. 10A, with some parts removed for clarity, showing gears in a wheel hub of a steering knuckle gearbox assembly of the front-right track system of FIG. 10A.

More particularly, in the present embodiment, and as best shown (schematically) in FIG. 5, the steering knuckle gearbox assembly 138 includes a steering knuckle 152 that is received in a recess defined in the vehicle-facing side of the housing portion 140. The steering knuckle 152 is best shown in FIGS. 6 and 7. The steering knuckle 152 is mounted in the recess of the housing portion 140 via a plurality of bolts 170 received through a part of the housing portion 140 and into corresponding apertures 172 defined in the steering knuckle 152. It is contemplated that the steering knuckle 152 could be instead received and mounted over a part of the housing portion 140. It contemplated that the steering knuckle 152 could be secured to the housing portion 140 using a different securing mechanism, such as another type of fasteners.

In the present embodiment, the mating portion 142 of the steering knuckle gearbox assembly 138 is part of the steering knuckle 152 (and is therefore is detachably connected to the housing portion 140) and has apertures 162, 164 defined in the mating portion 142. The mating portion 142 is positioned on the interior vehicle-facing side of the housing portion 140 and is pivotably mounted to the distal end 156 of the front-right axle frame 106*a* so as to pivot about a steering axis 146 between a first angular position 148 to a second angular position 150 (FIG. 5B), for steering the vehicle 100 leftward and rightward, respectively. As best shown in FIG. 1, the steering axis 146 is angled to provide the front-right track system 110 with a positive effective caster. It is contemplated that the steering axis 146 could be oriented differently.

In the present embodiment, the mating portion 142 of the steering knuckle gearbox assembly 138 is pivotably mounted to the distal end of the front-right axle frame 106*a* via a king pin assembly. The king pin assembly includes two pins 158, 160 received in corresponding pairs of apertures 162, 166 and 164, 168 defined in the mating portion 142 and the distal end of the front-right axle frame 106*a*, respectively. It is contemplated that a different pivot connection could used.

As best shown in FIG. 5A, in the present embodiment, the mounting portion 144 of the steering knuckle gearbox assembly 138 is positioned in front of the input shaft 176 (on the same side of the axle frame 106*a* as is the steering link 90) and is also part of the steering knuckle 152 (i.e. the mounting portion 144 is detachably connected to the housing portion 140). The front-right steering link 90 of the vehicle 100 is pivotably mounted to the mounting portion 144 using a conventionally known pin (not shown) received in a steering mount aperture 145 (see FIG. 6) defined in the mounting portion 144. In the present embodiment, the steering mount aperture 145 has an upper aperture and a lower aperture, but could have any other suitable configuration.

The mounting portion 144 is structured, dimensioned and positioned relative to the body 154 of the steering knuckle gearbox assembly 138 such that pivoting of the steering wheel of the vehicle 100 (which correspondingly moves the steering link 90) pivots the steering knuckle gearbox assembly 138 about the steering axis 146 between the first angular position 148 and the second angular position 150.

Now referring to FIGS. 2 and 5A, the housing portion 140 of the steering knuckle gearbox assembly 138 has a cavity 174 (shown schematically in FIGS. 2 and 5A) defined in the housing portion 140. The steering knuckle gearbox assembly 138 includes an input shaft 176. The input shaft 176 is rotationally supported by the housing portion 140 for rotation about an input axis 178 defined by the input shaft 176. The input shaft 176 has an inner end positioned inside the cavity 174 and an outer end opposite the inner end.

In the present embodiment, the outer end of the input shaft 176 is connected to the front-right drive axle 94 via a universal joint 180 (shown schematically in FIG. 5A) so as to be drivable by the drive axle 94 when the body 154 of the steering knuckle gearbox assembly 138 is in any one of a range of angular positions between the first angular position 148 and the second angular position 150. More particularly, in the present embodiment, the universal joint 180 is positioned relative to the body 154 such that the steering axis 146 passes through the universal joint 180. In other embodiments, different connections between the input shaft 176 and the drive axle 94 are used. It is contemplated that neither the drive shaft 94 nor the input shaft 176 need to pass through the steering axis 146.

Still referring to FIG. 5A, the steering knuckle gearbox assembly 138 also includes an output shaft 182. The output shaft 182 is rotationally supported by the housing portion 140 for rotation about an output axis 184 defined by the output shaft 182. In the present embodiment, the output axis 184 is upwardly offset from the input axis 178. In other words, in the present embodiment, the output axis 184 is offset vertically upward from the input axis 178. In other embodiments, the output axis 184 is upwardly offset and also longitudinally away from the input axis 178. In some embodiments, the longitudinal offset component (where present) is in a forward direction. In other embodiments, the longitudinal offset component (where present) is in a rearward direction.

In another aspect, the output shaft 182 has an inner end positioned inside the cavity 174 and an outer end opposite to the inner end. The inner end of the output shaft 182 is operatively connected to the inner end of the input shaft 176 to be driven by the input shaft 176. In the present embodiment, the inner end of the output shaft 182 is operatively connected to the inner end of the input shaft 176 via a conventionally known gear train 186 disposed inside the cavity 174, such that the output shaft 182 is driven by the input shaft 176 at a predetermined gear ratio. In this embodiment, the gear train 186 is a conventionally known spur gear train.

In another aspect, steering knuckle gearbox assembly 138 also includes a wheel hub 188 that is connected to the output shaft 182 to be driven by the output shaft 182. As best shown in FIGS. 2 and 5A, the wheel hub 188 is a metal disk 188 positioned on an exterior side of the housing portion 140 of the steering knuckle gearbox assembly 138. As best shown by FIGS. 1 and 2, a drive sprocket 190 is mounted to the wheel hub 188 via a plurality of bolts 192 extending from the wheel hub 118 and received through apertures (not shown) defined in the drive sprocket 190. Nuts (not shown) are threaded onto the bolts 192 to hold the drive sprocket 190 in place. It is contemplated that any other suitable mounting mechanism could be used.

The drive sprocket 190 is an example of a drive wheel 190 for driving an endless track 194 of the front-right track system 110. It is contemplated that the drive sprocket 190 could be any other drive wheel for driving the endless track 194, for example depending on the particular embodiment of the endless track 194 to be used with the track system 110. It is also contemplated that the wheel hub 188 could be a different wheel hub, for example depending on the particular drive wheel 190 of the track system 110.

In another aspect, and as best shown in FIGS. 2, 3, 5A, 8 and 9, the steering knuckle gearbox assembly 138 also includes a pivot axle 196. The pivot axle 196 is mounted to a bottom side of the housing portion 140 and defines a pivot axis 198. In the present embodiment, the pivot axis 198 is parallel to the axes of rotation of the wheel hub 188 and the output shaft 182, which are collinear and shown with reference numeral 184 in FIG. 5A. In the present embodiment, the pivot axle 196 is a metal shaft 196 that is mounted to the housing portion 140 via a pair of metal brackets 200, 202 fastened to the bottom side of the housing portion 140 via conventionally known fasteners.

In an aspect, the pivot axle 196 transmits at least some of the weight of the vehicle 100 borne by the axle frame 106*a* to the track system frame 204 (which is described in more detail below) of the track system 110, and thereby reduces at least parts of loads borne by the wheel hub 188. In some applications, the reduction of loads borne by the wheel hub 188 reduces wear of various components of the track system 110. For example, in some embodiments, the reduction of loads borne by the wheel hub 188 reduces wear of at least some components of the gear train 186 of the track system 110.

As mentioned herein above, the track system 110 includes a track system frame 204. The track system frame 204 is pivotably mounted to the pivot axle 196 to pivot about the pivot axis 198. More particularly, the track system frame 204 has a pivot axle aperture 206 (FIG. 4) defined in the track system frame 204. The pivot axle 196 is pivotably received and secured in the pivot axle aperture 206. In the present embodiment, a conventionally known bearing assembly (not shown) is disposed radially over the pivot axle 196 between the pivot axle 196 and the track system frame 204 to allow for the pivoting motion of the track system frame 204. In other embodiments, other pivot connections are used. In an aspect, pivoting of the track system frame 204 about the pivot axle 196 improves stability and traction characteristics of the vehicle 100 when the vehicle 100 is driven on some particular types of terrain.

Figure 3:
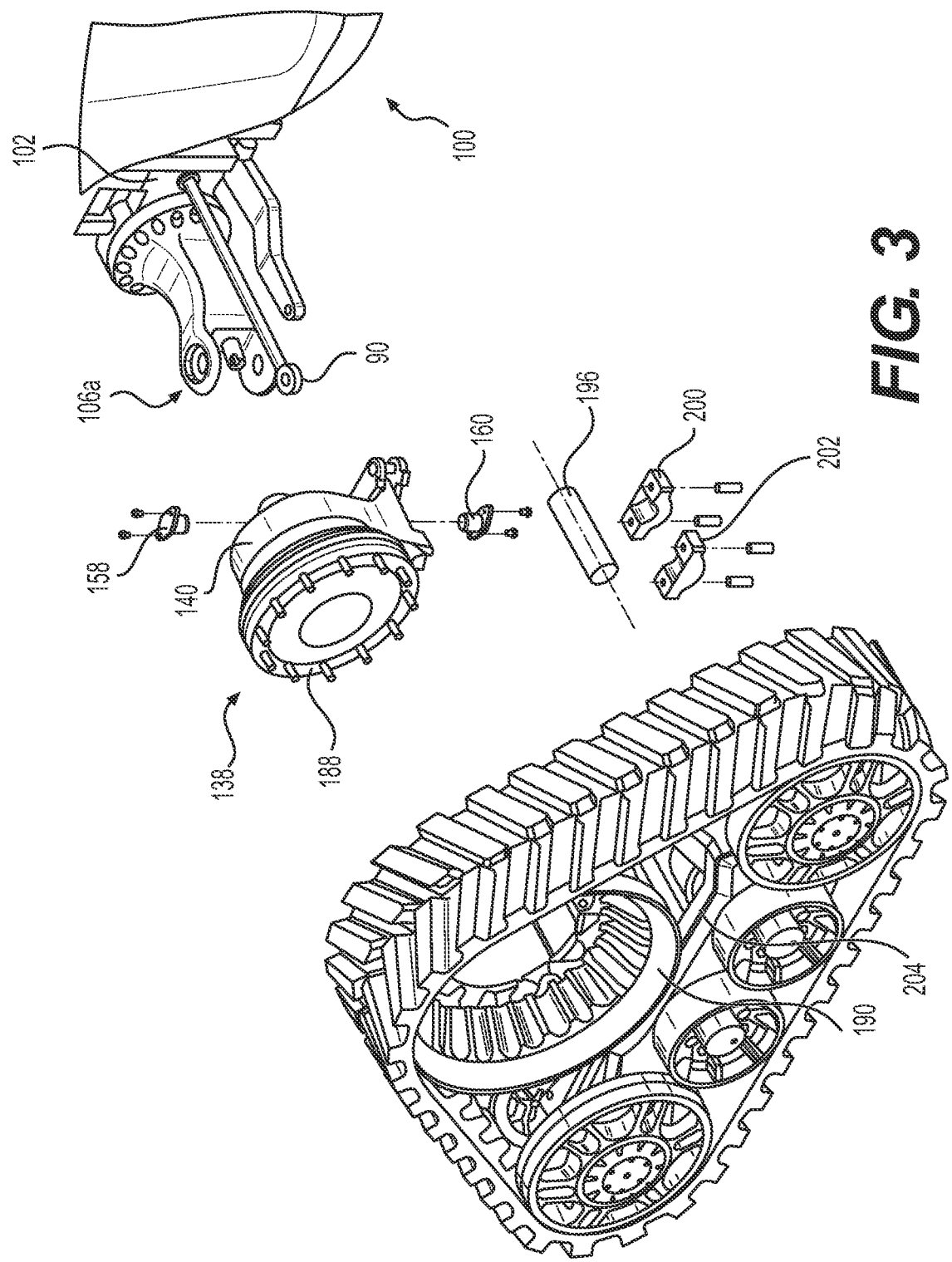
FIG. 3 is a first perspective schematic partial assembly view, taken from a front, right side of the front-right track system of the vehicle of FIG. 1.
Figure 4:
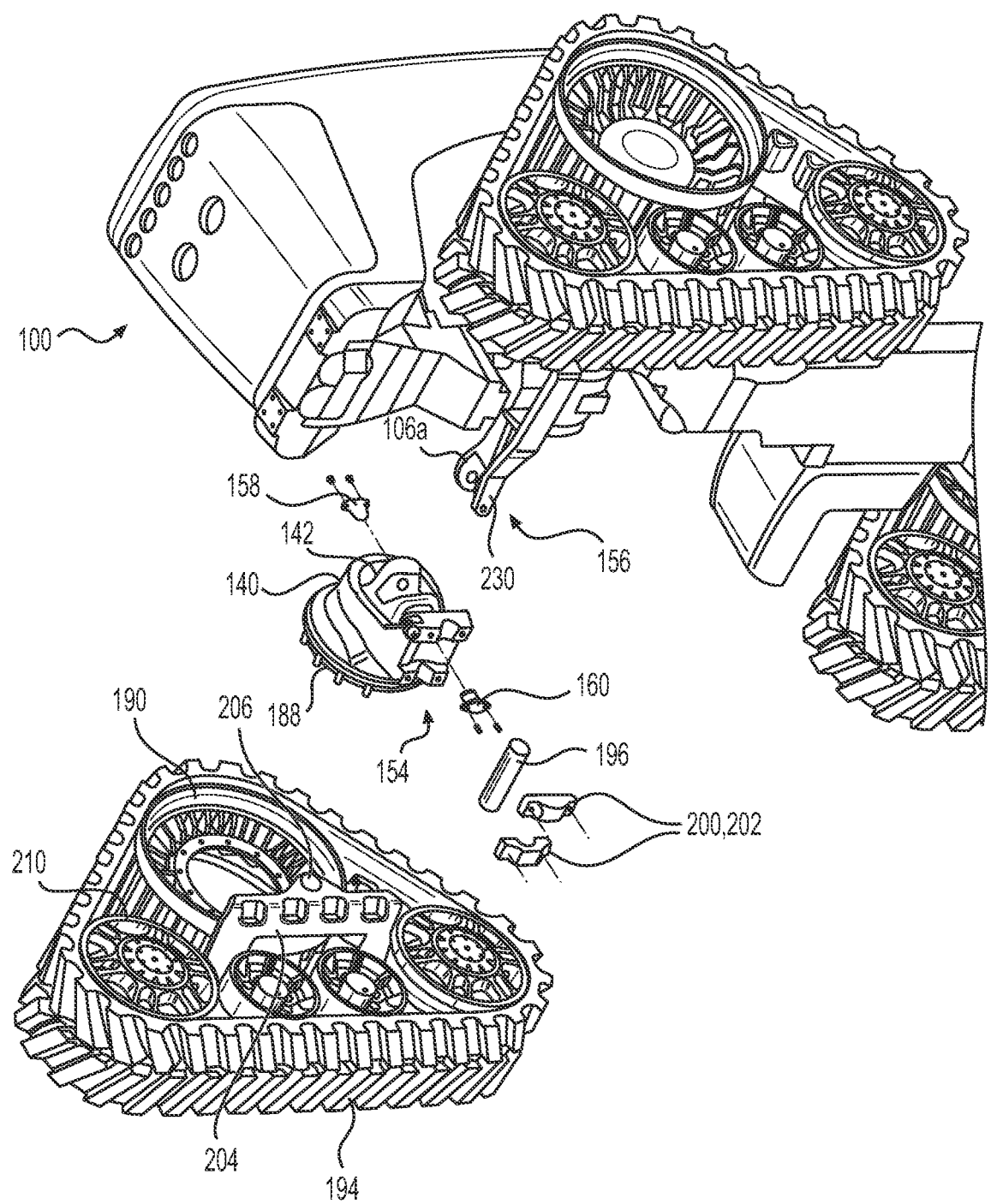
FIG. 4 is a second perspective schematic partial assembly view, taken from a front, left, bottom side of the vehicle of FIG. 1.

As best shown in FIGS. 1, 3 and 4, in the present embodiment, the track system frame 204 is a single structural member. In other embodiments, the track system frame 204 includes a plurality of pivotably interconnected structural members, similar to the track system frame 132. The track system frame 204 rotationally supports four idler wheels 210. It is contemplated that the track system frame 204 could have a different number and arrangement of idler wheels 210.

The endless track 194 extends around the idler wheels 210 and the drive sprocket 190. The endless track 194 is a conventionally known track that is in driving engagement with the drive sprocket 190 to be driven by the drive sprocket 190 for propelling the vehicle 100. In the present embodiment, the endless track 194 has drive lugs 195 on an inner side of the track 194 that are received in corresponding apertures in the drive sprocket 190 to be driven by the drive sprocket 190. It is contemplated that the endless track 194 could be any other suitable track (in which case the drive wheel 190 would be selected to work with the particular different track 194).

Gear Ratios

The predetermined gear ratio of the front-right track system 110 is selected, using conventionally known engineering principles, to suit each particular application of the track system 110. Similarly, the predetermined gear ratio of the rear-right track system 108 is selected, using conventionally known engineering principles, to suit each particular application of the track system 108.

In the present embodiment, the predetermined gear ratios of the front track systems 110 are selected such that at a given power output of a motor (as determined by a given throttle position of the motor 98 while the transmission 96 of the vehicle 100 is in a given one of the gears of the transmission 96 of the vehicle 100), the front track systems 110 have a ground speed that is equal to the ground speed of the rear track systems 108 at the given power output of a motor during a straight-forward movement of the vehicle 100.

Figure 15:
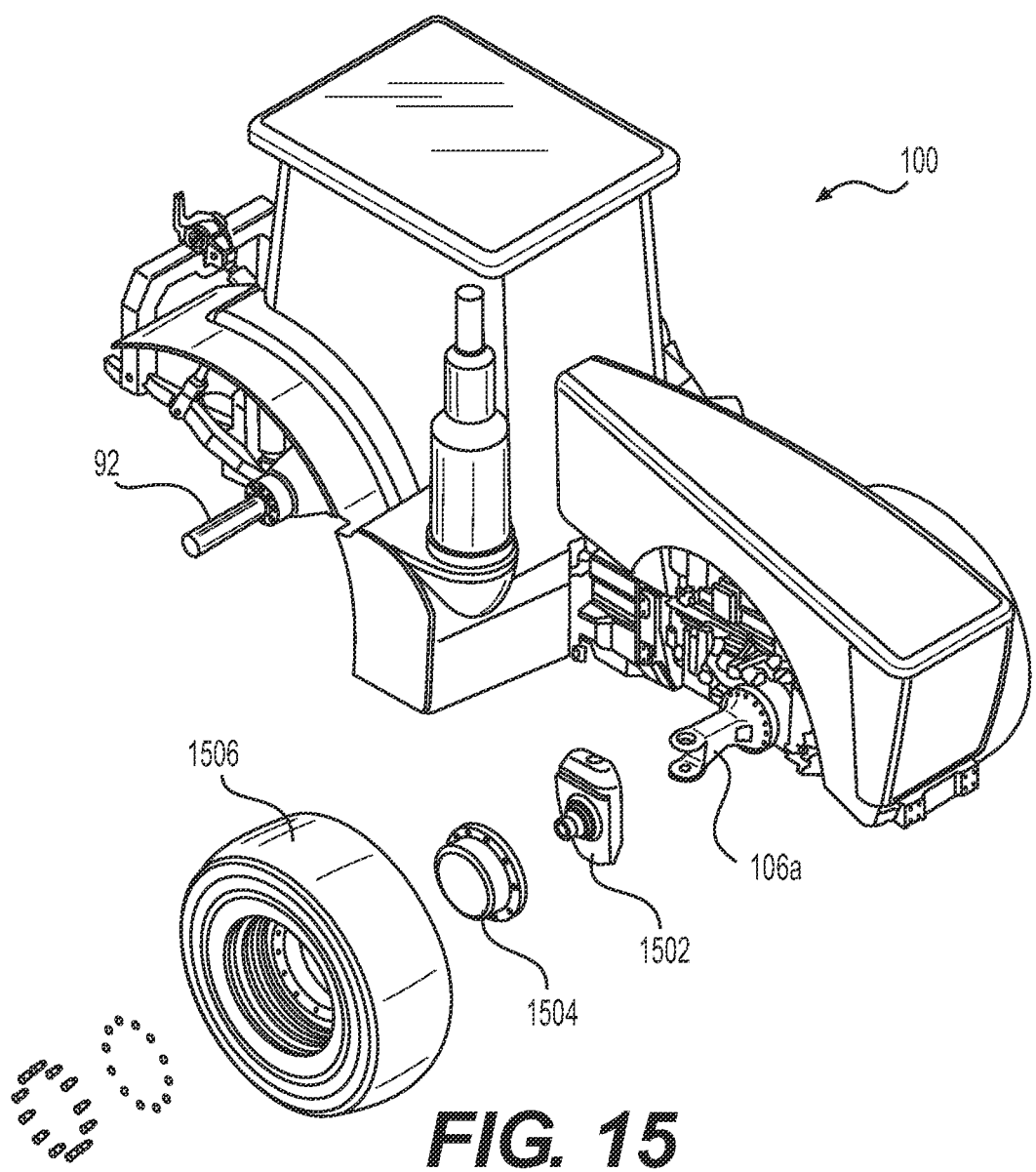
FIG. 15 is a perspective partial schematic assembly view of the vehicle of FIG. 1, taken from a front, right, top side of the vehicle, with some parts removed for clarity, the vehicle being equipped with two front wheel assemblies.

As another example, in cases where the track system 110 is used to replace a wheel of a vehicle, the predetermined gear ratio of the track system 110 could be selected so that at a given power output of the motor of that vehicle, the ground speed of the track system 110 is substantially equal to ground speed, at that given power output of the motor, of the wheel replaced by the track system 110. FIG. 15 shows the vehicle 100 being manufactured with a conventionally known steering knuckle 1502, wheel hub 1504, and wheel 1506. As an example, the track system 110 could replace the steering knuckle 1502, wheel hub 1504, and wheel 1506, In this case, the predetermined gear ratio of the track system 110 could be selected so that at a given power output of the motor of the vehicle 100, the ground speed of the track system 110 during straight-forward movement of the vehicle 100 is substantially equal to the ground speed of the wheel 1506 during straight-forward movement of the vehicle 100, at that given power output of the motor.

As another example, in this case, the predetermined gear ratio of the track system 110 could be instead selected so that at the given power output of the motor of the vehicle 100, the ground speed of the track system 110 is within a predetermined percentage of the ground speed of the wheel 1506 at that given power output of the motor. In some embodiments, the predetermined percentage is 20% inclusive. In some embodiments, the predetermined percentage is 5% inclusive. It is to be understood that the ground speed of the rear-right wheel or track system (depending on whether the rear-right wheel is also replaced by a track system) during straight-forward movement of the vehicle 100 would have to equal the ground speed of the track system 110 during straight-forward movement of the vehicle 100.

A similar selection method of the predetermined gear ratio of the rear-right track system 108 could be used in cases where the track system 108 is used to replace a wheel of a vehicle.

In one aspect, the presence of the gear trains of the track systems 108, 110 in at least some cases allow the track systems 108, 110 to be used in a relatively larger number of applications.

Second Embodiment of the Steering Knuckle Gearbox Assembly

A second embodiment of the steering knuckle gearbox assembly 138 is described next, with reference to FIGS. 10A to 10D. The steering knuckle gearbox assembly 1000 is the same as the steering knuckle gearbox assembly 138 except insofar as it is described next.

The steering knuckle gearbox assembly 1000 does not have a separately-defined steering knuckle as does the steering knuckle gearbox assembly 138. Instead, the mating portion 1002 (for pivotably mounting the steering knuckle gearbox assembly 1000 to the distal end of the axle frame 106a via the pins 158, 160) is integral with the housing portion 1004 of the steering knuckle gearbox assembly 1000. Similarly, the mounting portion 1006 of the steering knuckle gearbox assembly 1000 (for having the steering link 90 pivotably mounted thereto) is integral with the housing portion 1004.

In another aspect, the pivot axle 1008 of steering knuckle gearbox assembly 1000 is integral with the housing portion 1004. In this embodiment, a metal disk 1010 is fastened to a distal end of the pivot axle 1008 when the pivot axle 1008 is received in the pivot axle aperture 206 (FIG. 7) of the track system frame 204. The metal disk 1010 thereby pivotably secures the track system frame 204 to the housing portion 1004 so that the track system frame 204 is pivotable about the pivot axis 198. In the present embodiment, the metal disk 1010 is fastened to the distal end of the pivot axle 1008 via a conventionally known fastener, and more particularly a bolt. The bolt is received in a corresponding threaded aperture defined in the distal end of the pivot axle 1008.

The gear train 1012 of the steering knuckle gearbox assembly 1000 is a plurality of 45-degree bevel gears that connect the input shaft 1014 to the output shaft 1016. In the present embodiment, each gear of the plurality of 45-degree bevel gears all have one has one and the same number of teeth as the other gears of the plurality of 45-degree bevel gears. Therefore, the gear train 1012 connects the input shaft 1014 to the output shaft 1016 at a 1:1 gear ratio.

In another aspect, in this embodiment, the wheel hub 1018 of the steering knuckle gearbox assembly 1000 has a cavity 1020 defined in the wheel hub 1018. A planetary gear train 1022 is disposed in the cavity 1020. The outer end of the output shaft 1016 extends into the cavity 1020 and is operatively connected to the wheel hub 1018 via the planetary gear train 1022 to drive the wheel hub 1018 (and therefore the drive wheel 190 of the steering knuckle gearbox assembly 1000) at a second predetermined gear ratio.

In the present embodiment, the effective gear ratio between the input shaft 1014 and the wheel hub 1018 is a function of the predetermined gear ratio of the gear train 1012 and the predetermined gear ratio of the gear train 1012 is 1:1, the effective gear ratio between the input shaft 1014 and the wheel hub 1018 is equal to the predetermined gear ratio of the planetary gear train 1022. In other embodiments, and depending on the particular application of the steering knuckle gearbox assembly 1000, the gear train 1012 is selected to provide a non-1:1 gear ratio between the input shaft 1014 and the output shaft 1016.

In some cases, providing an effective gear ratio between the input shaft 1014 and the wheel hub 1018 via the combination of the first and second predetermined gear ratios provides relatively more flexibility in dimensioning the housing portion 1004 and the wheel hub 1018. In some cases, providing the effective gear ratio between the input shaft 1014 and the wheel hub 1018 via the combination of the first and second predetermined gear ratios provides relatively more flexibility in selecting particular combinations of gears for the gear train 1012 and the planetary gear train 1022.

The particular combinations of gears of each gear train 1012, 1022 are selected using conventionally known engineering principles.

Third Embodiment of the Steering Knuckle Gearbox Assembly

Figure 11A:
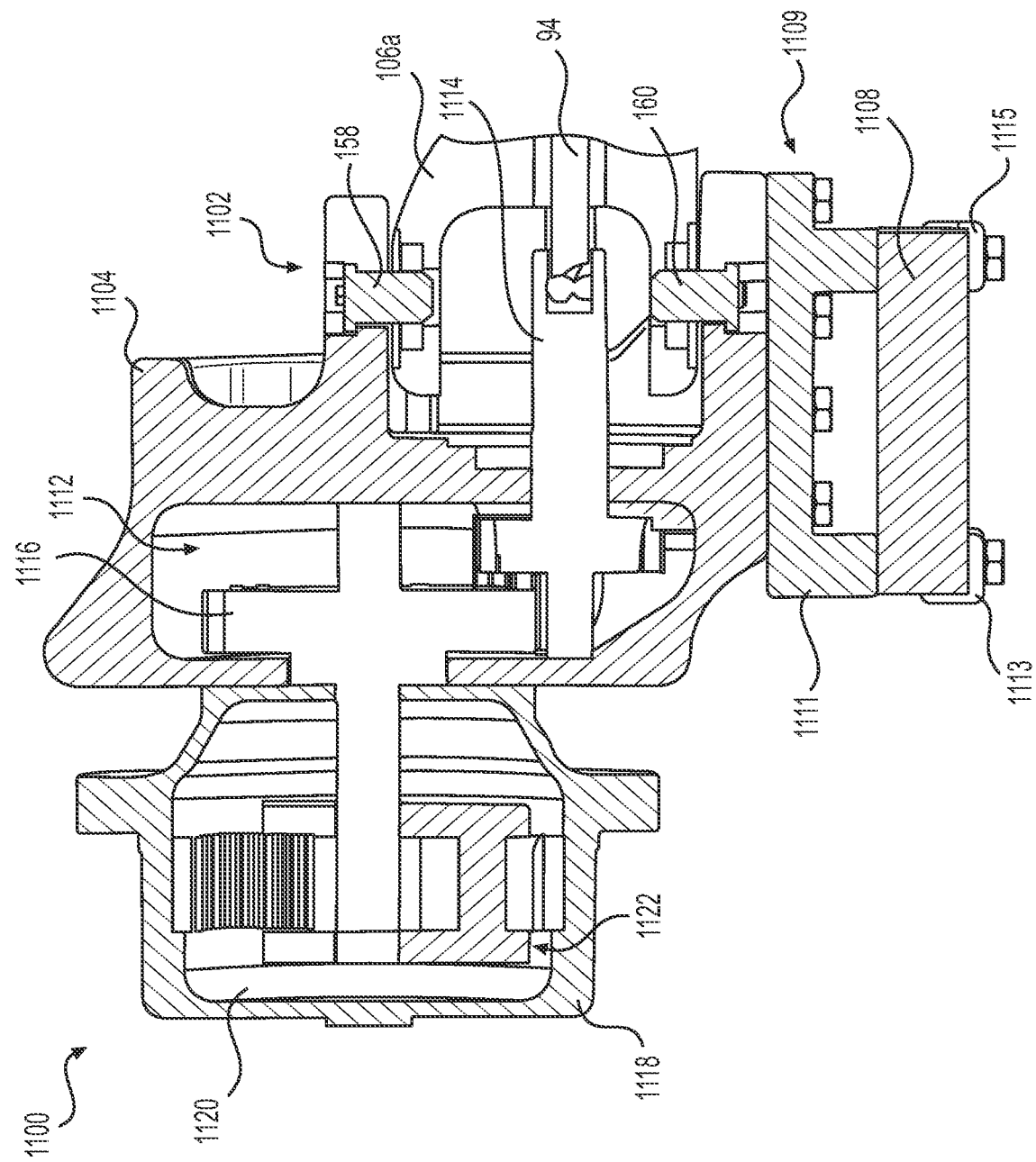
FIG. 11A is a front elevation partial schematic sectional view of a third embodiment of the front-right track system of the vehicle of FIG. 1, with some parts removed for clarity.
Figure 11B:
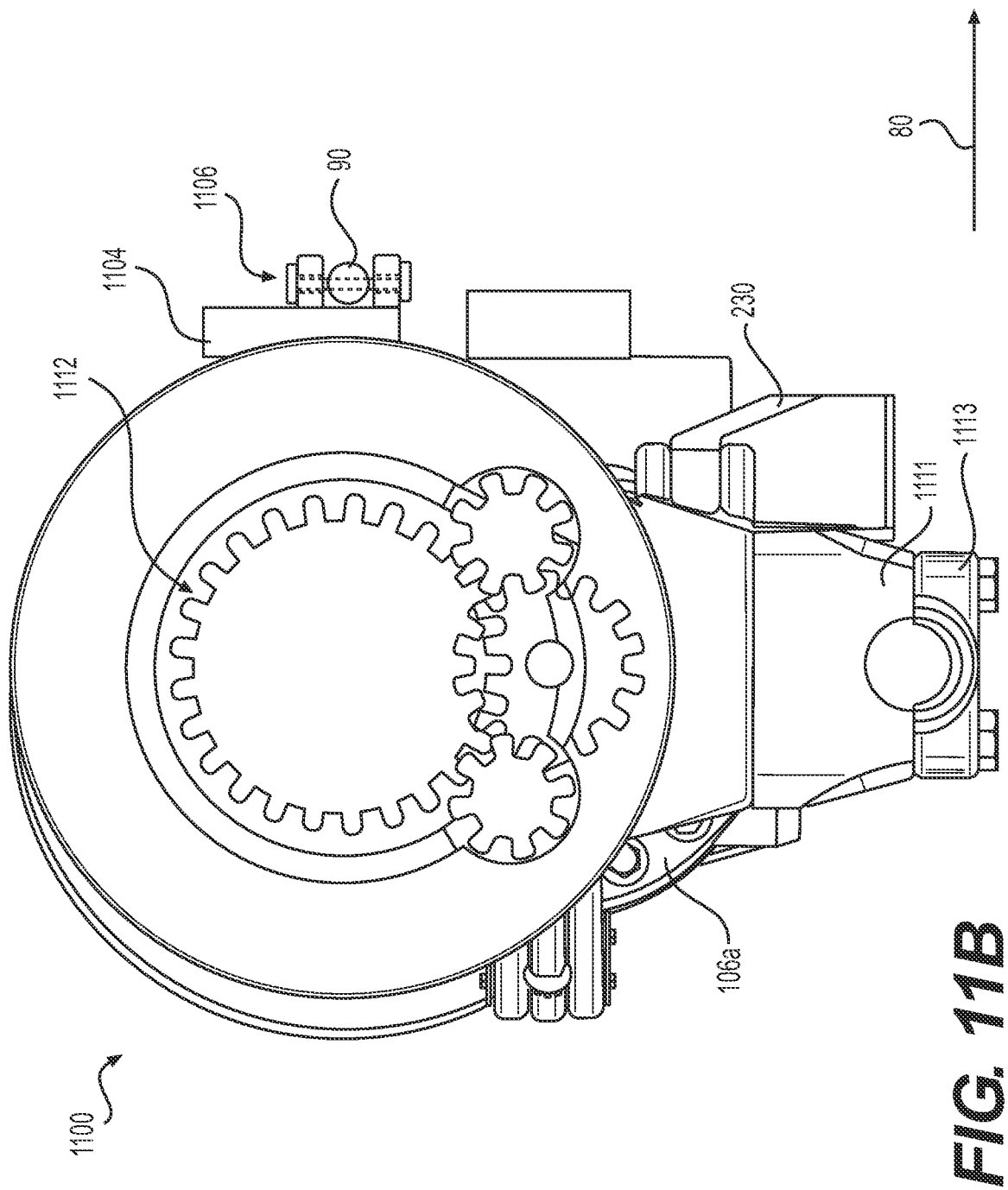
FIG. 11B is a right side elevation, partial schematic sectional view, of the third embodiment of the front-right track system of FIG. 11A, with some parts removed for clarity, showing gears in a housing portion of a steering knuckle gearbox assembly of the front-right track system of FIG. 11A.
Figure 11C:
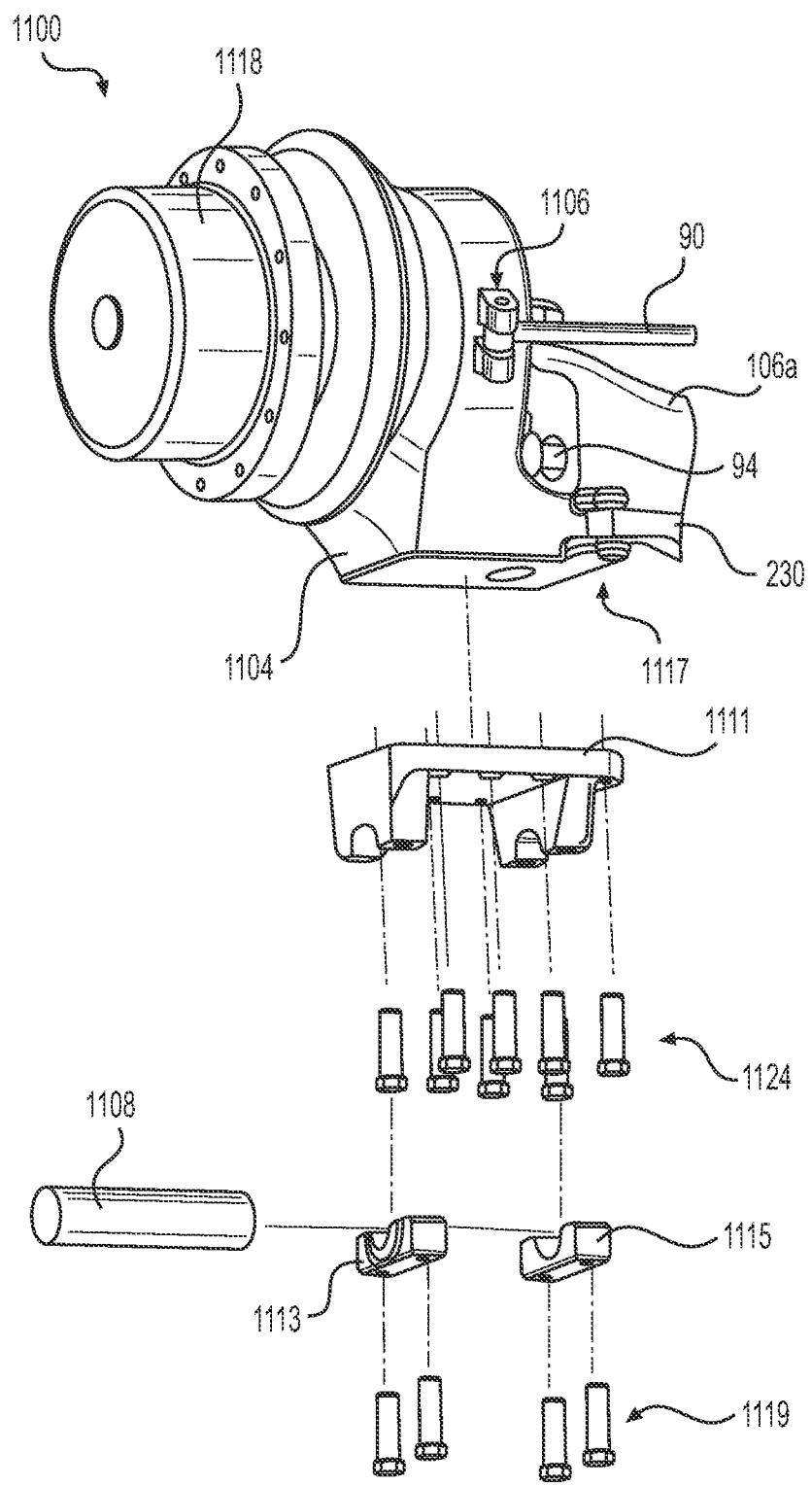
FIG. 11C is a perspective, partial, schematic assembly view of the front-right track system of the vehicle of FIG. 11A, taken from a front, right side of the front-right track system of the vehicle of FIG. 11A, with some parts removed for clarity.

A third embodiment of the steering knuckle gearbox assembly 138 is described next, with reference to FIGS. 11A to 11C. The steering knuckle gearbox assembly 1100 is the same as the steering knuckle gearbox assembly 138 except insofar as it is described next.

The steering knuckle gearbox assembly 1100 does not have a separately-defined steering knuckle as does the steering knuckle gearbox assembly 138. Instead, the mating portion 1102 (for pivotably mounting the steering knuckle gearbox assembly 1100 to the distal end of the axle frame 106a via the pins 158, 160) is integral with the housing portion 1104 of the steering knuckle gearbox assembly 1100. Similarly, the mounting portion 1006 of the steering knuckle gearbox assembly 1000 (for having the steering link 90 pivotably mounted thereto) is integral with the housing portion 1004.

In another aspect, the pivot axle 1108 of steering knuckle gearbox assembly 1100 is removably connected to the bottom side of the housing portion 1104 via a mounting assembly 1109 such that the pivot axle 1108 is removably connectable to the bottom side of the housing portion 1104 in any one of a plurality of positions that are offset from each other laterally. In some cases, this allows for various adjustments of the track system 110.

In the present embodiment, the pivot axle 1108 is a metal shaft. The mounting assembly 1109 includes a plate 1111 and two brackets 1113, 1115 fastened to the plate 1111 (via conventionally known fasteners 1119). The brackets 1113, 1115 secure the pivot axle 1108 to the plate 1111 by receiving the pivot axle 1108 in corresponding cavities defined in the brackets 1113, 1115 and by being fastened to the plate 1111 via the fasteners 1119.

The bottom side of the housing portion 1104 has a plurality of threaded apertures 1117 defined in the housing portion 1104. The threaded apertures 1117 define the plurality of positions in any one of which the plate 1111 can be removably connected to the bottom side of the housing portion 1104. The threaded apertures 1117 are arranged such that the plate 1111 can be removably connected to at least two different positions on the bottom side of the housing portion 1104 by being fastened to corresponding ones of the threaded apertures 1117 with conventionally known fasteners 1124.

In this embodiment, the track system frame 204 is pivotably mounted onto the pivot axle 1108 as follows. First, the pivot axle 1108 is received in the pivot axle aperture 206 in the track system frame 204. Then, the pivot axle 1108 is secured to the plate 1111 via the brackets 1113, 1115, as described above (in this embodiment, the brackets 1113, 1115 are positioned on different sides of the track system frame 204). Then, the plate 1111 is secured to the bottom side of the housing portion 1104 in any one of the plurality of positions on the bottom side of the housing portion 1104 by being fastened to corresponding ones of the threaded apertures 1117 with conventionally known fasteners 1124.

In some cases, the plate 1111 could be repositioned on the bottom side of the housing portion 1104 by being fastened to a different set of corresponding threaded apertures 1117, where a first use of the vehicle 100 changes to a different use of the vehicle 100. For example, in some cases, the plate 1111 could be repositioned on the bottom side of the housing portion 1104 when the vehicle 100 is to be used on a different kind of terrain.

In a further aspect, the gear train 1112 of the steering knuckle gearbox assembly 1100 includes a plurality of spur gears that connect the input shaft 1014 to the output shaft 1016 at a first predetermined gear ratio, which, in this embodiment, is a non-1:1 gear ratio.

In this embodiment, the wheel hub 1118 and the planetary gear train 1122 of the steering knuckle gearbox assembly 1100 are the same as the wheel hub 1018 and the planetary gear train 1022 of the steering knuckle gearbox assembly 1000, respectively. The outer end of the output shaft 1116 extends into the cavity 1120 in the wheel hub 1118 and is operatively connected to the wheel hub 1018 via the planetary gear train 1122 to drive the wheel hub 1118 (and therefore the drive wheel 190 of the steering knuckle gearbox assembly 1100) at a second predetermined gear ratio.

The first and second predetermined gear ratios are selected (using conventionally known engineering principles) to provide the effective (overall) gear ratio between the wheel hub 1118 and the input shaft 1114 of the steering knuckle gearbox assembly 1100, as described above with respect to the other embodiments of the steering knuckle gearbox assembly 1100.

Fourth Embodiment of the Steering Knuckle Gearbox Assembly

Figure 12:
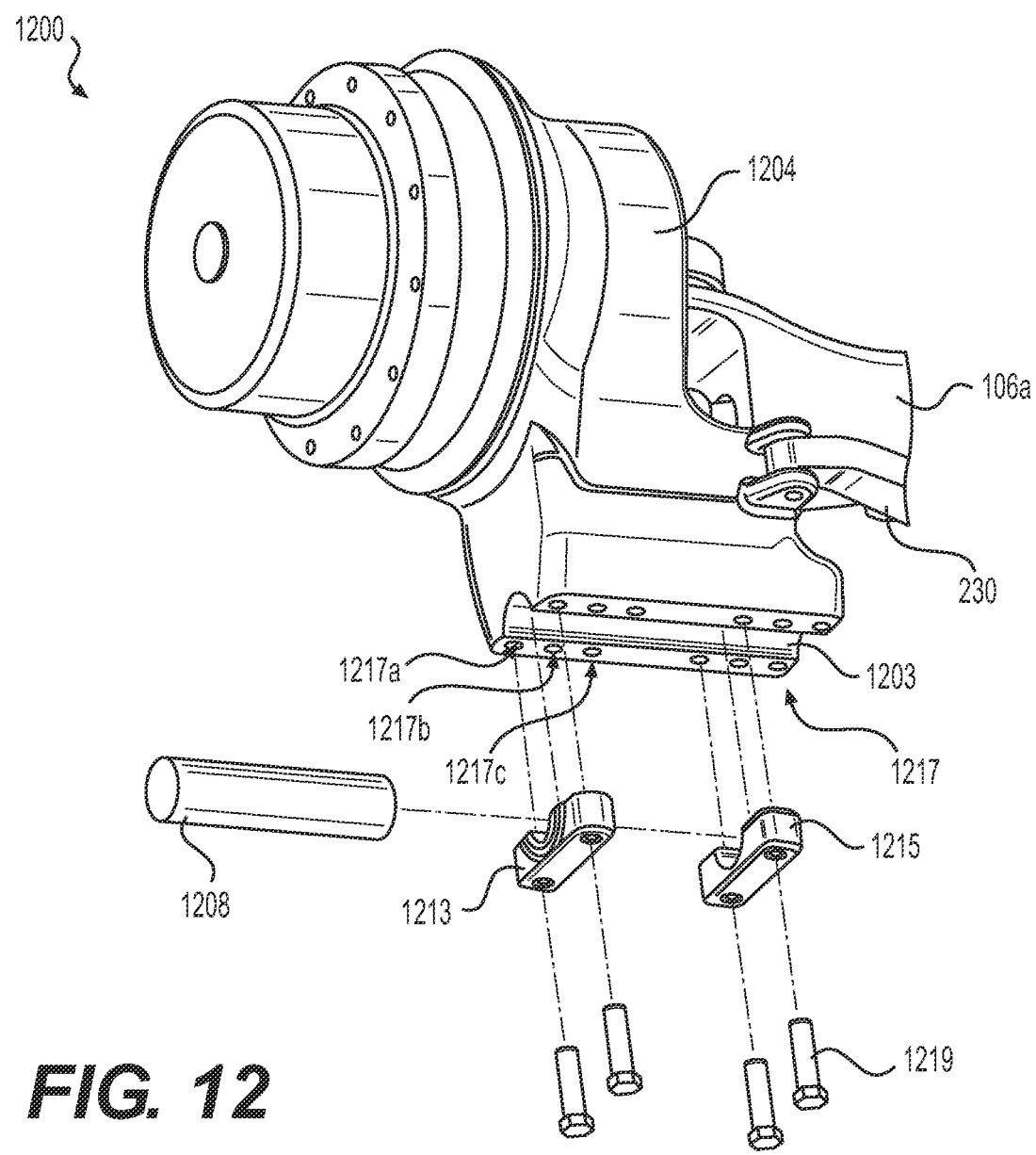
FIG. 12 is a perspective, partial, schematic assembly view of a fourth embodiment of the front-right track system of the vehicle of FIG. 1, taken from a front, right, bottom side of the front-right track system of the vehicle of FIG. 1, with some parts removed for clarity.

A fourth embodiment of the steering knuckle gearbox assembly 138 is described next, with reference to FIG. 12.

The steering knuckle gearbox assembly 1200 is the same as the steering knuckle gearbox assembly 1100 except insofar as it is described next.

The housing portion 1204 has a cavity 1203 defined in the bottom side of the housing portion 1204, and the plurality of threaded apertures 1217 are defined in the bottom side of the housing portion 1204 on each side of the cavity 1203. The threaded apertures 1217 define three different positions 1217*a-c* on the bottom side of the housing portion 1204 to any one of which the pivot axle 1208 could be removably connected. The three different positions 1217*a-c* are laterally offset from each other. It is contemplated that the number of laterally-offset positions 1217*a-c* could differ.

In this embodiment, the pivot axle 1208 is removably connectable to the bottom side of the housing portion 1104 in any one of the three positions 1217*a-c* by via two brackets 1213, 1215. The brackets 1213, 1215 secure the pivot axle 1208 in the cavity 1203 by receiving the pivot axle 1208 in corresponding cavities defined in the brackets 1213, 1215 and by being fastened to the bottom side of the housing portion 1204 via the fasteners 1219 received in corresponding ones of the threaded apertures 1217.

In some embodiments, securing the pivot axle 1208 in different ones of the laterally-offset positions 1217*a-c* could be used to adjust the lateral spacing of the endless track of a track system having the steering knuckle gearbox assembly 1100 from the vehicle frame 102. For example, when the front-right track system 110 of the vehicle 100 has the steering knuckle gearbox assembly 1100 (instead of the steering knuckle gearbox assembly 138), securing the pivot axle 1208 in different ones of the laterally-offset positions 1217*a-c* could be used to adjust the lateral spacing between the endless track 194 of the front-right track system 110 and the endless track of the front-left track system. In some such embodiments, the adjustment does not require replacing or altering the stabilization bar 230, the front steering links, or the front drive axles of the vehicle 100.

In some embodiments of the steering knuckle gearbox assembly 1200, adjusting the lateral position of the pivot axle 1208 (and therefore the lateral spacing) may require, for example, flipping the drive wheel of the track system that has the steering knuckle gearbox assembly 1200. In some embodiments of the steering knuckle gearbox assembly 1200, adjusting the lateral position of the pivot axle 1208 (and therefore the lateral spacing) may require changing the drive wheel of the track system that has the steering knuckle gearbox assembly 1200 to a different drive wheel.

In some embodiments, such modifications may be required in order to help maintain a desired degree of alignment between the drive wheel of the track system that has the steering knuckle gearbox assembly 1200 and the other track-supporting wheels of that track system (such as the idler wheels 210, in cases where the track system 110 has the steering knuckle gearbox assembly 1200 instead of the steering knuckle gearbox assembly 138).

Fifth Embodiment of the Steering Knuckle Gearbox Assembly

Figure 13A:
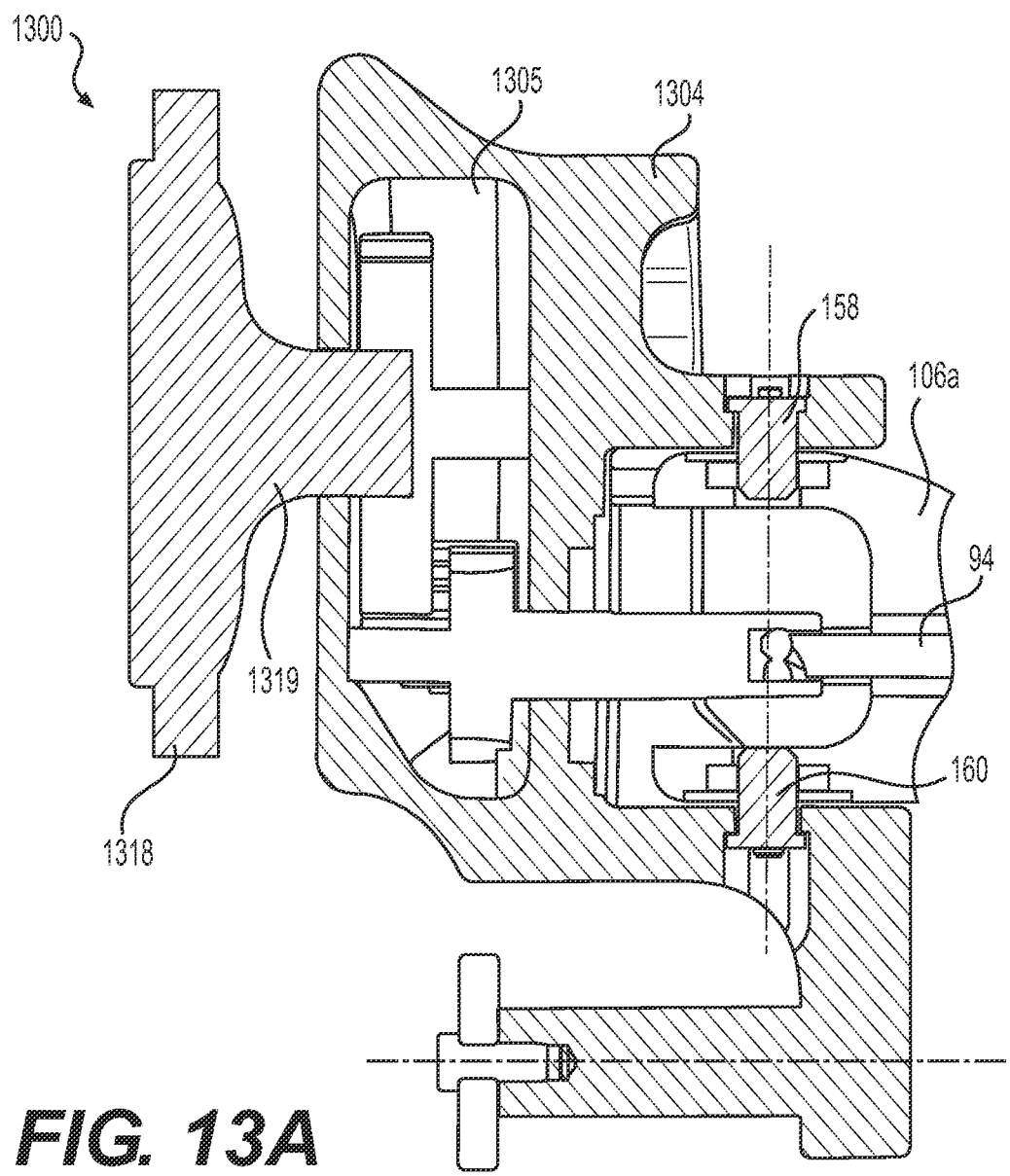
FIG. 13A is a front elevation, partial schematic sectional view, of a fifth embodiment of the front-right track system of FIG. 1, with some parts removed for clarity.

A fifth embodiment of the steering knuckle gearbox assembly 138 is described next, with reference to FIGS. 13A and 13B. The steering knuckle gearbox assembly 1300 is the same as the steering knuckle gearbox assembly 1000 except insofar as it is described next.

The wheel hub 1318 of the steering knuckle gearbox assembly 1300 is a metal disk 1318 that has a protrusion 1319 that extends into the cavity 1305 of the housing portion 1304. The wheel hub 1318 does not have a cavity or a gear train in the wheel hub 1318.

The protrusion 1319 of the wheel hub 1318 is received in and secured (via a conventionally known securement mechanism) in a cavity 1306 defined in an output gear 1308 of the gear train 1312, to be driven by the output gear 1308.

In this embodiment, the steering knuckle gearbox assembly 1300 has only one gear train (the gear train 1312). In this embodiment, the gear train 1312 is a conventionally known spur gear train selected based on each particular application of the steering knuckle gearbox assembly 1300 using conventionally known engineering principles, similar to the other embodiments of the steering knuckle gearbox assembly 138 and as described herein above.

Sixth Embodiment of the Steering Knuckle Gearbox Assembly

Figure 14A:
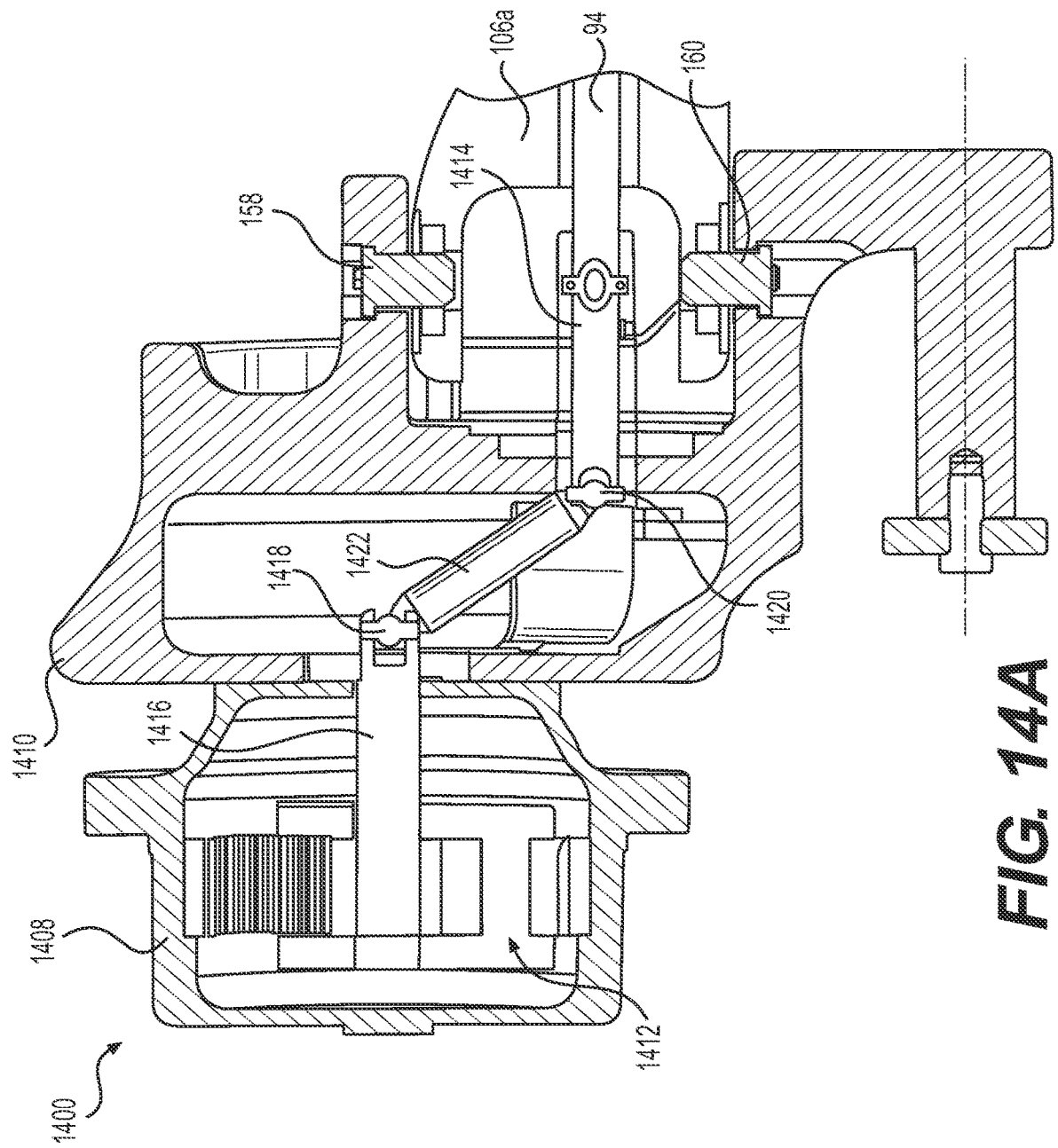
FIG. 14A is a front elevation, partial schematic sectional view, of a sixth embodiment of the front-right track system of FIG. 1, with some parts removed for clarity.
Figure 14B:
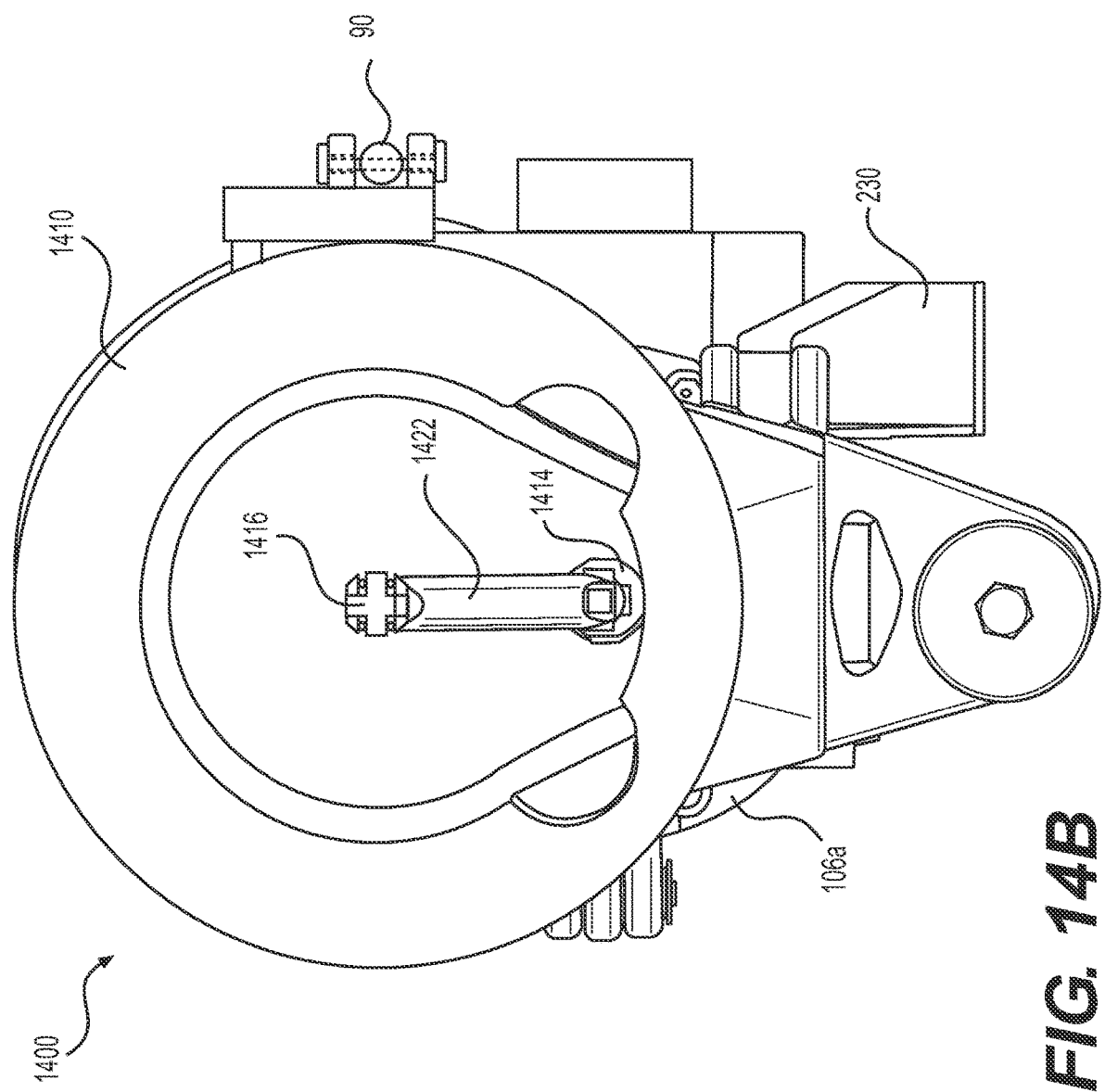
FIG. 14B is a right side elevation, partial schematic sectional view, of the front-right track system of the vehicle of FIG. 14A, with some parts removed for clarity, showing a universal joint in a housing portion of the front-right track system of the vehicle of FIG. 14A.

A sixth embodiment of the steering knuckle gearbox assembly 138 is described next, with reference to FIGS. 14A and 14B. The steering knuckle gearbox assembly 1400 is the same as the steering knuckle gearbox assembly 1000 except insofar as it is described next.

The input shaft 1414 is operatively connected to the output shaft 1416 via a plurality of universal joints 1418, 1420 and an intermediate shaft 1422. Thus, in this embodiment, the input shaft 1414 drives the output shaft 1416 at a 1:1 gear ratio.

In this embodiment, the wheel hub 1408 of the steering knuckle gearbox assembly 1400 is a pre-existing conventionally known wheel hub 1408 of an existing vehicle (an example of such a pre-existing wheel hub, the wheel hub 1504, is shown in FIG. 15), which wheel hub 1408 was re-used with the steering knuckle gearbox assembly 1400. In the present case, the pre-existing wheel hub 1408 has a pre-existing planetary gear train 1412 therein. The, pre-existing planetary gear train therein 1412 was re-used with the pre-existing wheel hub 1408.

That is, the housing portion 1410 of the steering knuckle gearbox assembly 1400 was structured to rotationally receive the pre-existing wheel hub 1408 thereon, based on the particular features and dimensions of the pre-existing wheel hub 1408. Similarly, the output shaft 1416 was structured to connect to the pre-existing planetary gear train 1412 of the pre-existing wheel hub 1408. Then, as shown in FIGS. 14A and 14B, the pre-existing wheel hub 1408 was rotationally mounted onto the housing portion 1410 and the output shaft 1416 was received in and connected to the pre-existing planetary gear train 1412 to drive the pre-existing wheel hub 1408 via the pre-existing planetary gear train 1412.

Accordingly, in some cases, the steering knuckle gearbox assemblies of the present technology allow to re-use a wheel hub of a steerable wheel assembly when retrofitting the steerable wheel assembly to a track system using a steering knuckle gearbox assembly of the present technology.

Examples of Uses

In summary, and as described herein above, the present technology provides a steering knuckle gearbox assembly, which steering knuckle gearbox assembly could be implemented in a track system for a vehicle. The vehicle 100 with which the various exemplary embodiments of the present technology have been described in this specification is a tractor. However, it is contemplated that the present technology could be used with other vehicles, such as: agriculture, construction, forestry, mining, military and powersports vehicles. Some specific examples of such vehicles include: a harvester, a utility cart, a trailer, an all-terrain vehicle ("ATV"), a utility-terrain vehicle ("UTV"), a side-by-side vehicle ("SSV"), and a truck.

It is contemplated that the vehicle 100 (or other vehicles) could be manufactured new with the steering knuckle gearbox assemblies and/or the track systems of the present technology. It is also contemplated that the steering knuckle gearbox assemblies and/or the track systems of the present technology could be manufactured as retrofit components for the vehicle 100 (or other vehicles). For example, the track systems of the present technology could be manufactured as a retrofit kit for a vehicle to replace a steerable wheel assembly of the vehicle, or to retrofit the steerable wheel assembly to a track system.

Embodiments of the present technology could be made using any suitable conventionally known engineering principles and using any suitable materials and manufacturing methods.

Embodiments of the present technology each have at least one of the above-mentioned object and/or aspects, but do not necessarily have all of them. It should be understood that some aspects of the present technology that have resulted from attempting to attain an above-mentioned object may not satisfy this object and/or may satisfy other objects not specifically recited herein.

Modifications and improvements to the above-described embodiments of the present technology may become apparent to those skilled in the art. The foregoing description is intended to be exemplary rather than limiting.

The invention claimed is:

1. A steering knuckle gearbox assembly for a vehicle, comprising:
    a body having,
        a housing portion having a cavity defined in the housing portion, the housing portion having an interior vehicle-facing side,
        a mating portion connected to the housing portion and being positioned on the interior vehicle-facing side of the housing portion, the mating portion being pivotably mountable to a distal end of an axle frame supported by and extending away from the vehicle so as to pivot about a steering axis between a first angular position and a second angular position, and
        a mounting portion positioned relative to the body such that a steering link extending away from the vehicle is pivotably mountable to the mounting portion for actuating pivoting of the body about the steering axis between the first angular position and the second angular position;
    an input shaft rotationally supported by the housing portion for rotation about an input axis defined by the input shaft, the input shaft having an inner end positioned inside the cavity of the housing portion and an outer end opposite the inner end, the outer end of the input shaft being connectable to a drive axle of the vehicle so as to be drivable by the drive axle when the body is in any one of a range of angular positions between the first angular position and the second angular position; and
    an output shaft rotationally supported by the housing portion for rotation about an output axis defined by the output shaft, the output axis being upwardly offset from the input axis, the output shaft having an inner end positioned inside the cavity of the housing portion and an outer end being opposite to the inner end of the output shaft, the inner end of the output shaft being operatively connected to the inner end of the input shaft to be driven by the input shaft.

2. The steering knuckle gearbox assembly of claim 1, wherein the mating portion is integral with the housing portion.

3. The steering knuckle gearbox assembly of claim 1, wherein a king pin aperture is defined in the mating portion, the king pin aperture being sized to receive a king pin through the king pin aperture for pivotably mounting the mating portion to the distal end of the axle frame.

4. The steering knuckle gearbox assembly of claim 3, wherein:
the outer end of the input shaft terminates at a coupler,
the coupler is operatively connectable to the drive axle to be driven by the drive axle when the body is in any one of the range of angular positions between the first angular position and the second angular position, and
the coupler is positioned relative to the mating portion such that the steering axis passes through the coupler.

5. The steering knuckle gearbox assembly of claim 1, wherein:
the inner end of the input shaft is operatively connected to the inner end of the output shaft via a first plurality of gears to drive the output shaft at a first predetermined gear ratio, and
the first plurality of gears is positioned inside the cavity of the housing portion.

6. The steering knuckle gearbox assembly of claim 1, wherein:
the housing portion has an exterior side opposite the interior vehicle-facing side,
the steering knuckle gearbox assembly includes a wheel hub operatively connected to the output shaft to be driven by the output shaft,
the wheel hub is positioned on the exterior side of the housing portion, and
the wheel hub is structured to have a drive wheel mounted thereto.

7. The steering knuckle gearbox assembly of claim 6, wherein:
the wheel hub defines a cavity in the wheel hub,
at least one additional gear is disposed inside the cavity of the wheel hub,
the outer end of the output shaft extends into the cavity of the wheel hub, and
the at least one additional gear operatively connects the outer end of the output shaft to the wheel hub to drive the wheel hub at a second predetermined gear ratio.

8. A steering knuckle gearbox assembly for a vehicle, comprising:
an axle frame having a vehicle end and a distal end opposite the vehicle end, the vehicle end being fixedly mountable to a vehicle frame;
a body having,
a housing portion having a cavity defined in the housing portion, the housing portion having an interior vehicle-facing side,
a mating portion connected to the housing portion and being positioned on the interior vehicle-facing side of the housing portion, the mating portion being pivotably connected to the distal end of the axle frame to pivot about a steering axis between a first angular position and a second angular position, and
a mounting portion positioned relative to the body such that a steering link extending away from the vehicle is pivotably mountable to the mounting portion for actuating pivoting of the body about the steering axis between the first angular position and the second angular position;
an input shaft rotationally supported by the housing portion for rotation about an input axis defined by the input shaft, the input shaft having an inner end positioned inside the cavity of the housing portion and an outer end opposite the inner end, the outer end of the input shaft being connectable to a drive axle so as to be drivable by the drive axle when the body is in any one of a range of angular positions between the first angular position and the second angular position; and
an output shaft rotationally supported by the housing portion for rotation about an output axis defined by the output shaft, the output axis being upwardly offset from the input axis, the output shaft having an inner end positioned inside the cavity of the housing portion and an outer end being opposite to the inner end of the output shaft, the inner end of the output shaft being operatively connected to the inner end of the input shaft to be driven by the input shaft.

9. The steering knuckle gearbox assembly of claim 1, further comprising a pivot axle connected to a bottom side of the body in a first position, the pivot axle defining a frame pivot axis that is parallel to the output axis, the pivot axle being structured to have a track system frame pivotably mounted to the pivot axle to be pivotable about the frame pivot axis.

10. The steering knuckle gearbox assembly of claim 9, wherein:
the pivot axle is removably connected to the bottom side of the body and is connectable to the bottom side of the body in at least one additional position, the additional position being offset from the first position in a transverse direction.

11. A steerable track system for a vehicle, comprising:
the steering knuckle gearbox assembly as claimed in claim 1;
a frame operatively connected to the vehicle;
a plurality of wheels rotationally connected to the frame;
a drive wheel positioned on the exterior side of the housing portion, the drive wheel being operatively connected to the output shaft to be driven by the output shaft; and
an endless track extending around the plurality of wheels and the drive wheel, the endless track being in driving engagement with the drive wheel to be driven by the drive wheel.

12. The steering knuckle gearbox assembly of claim 8, wherein:
the inner end of the input shaft is operatively connected to the inner end of the output shaft via a first plurality of gears to drive the output shaft at a first predetermined gear ratio, and
the first plurality of gears is positioned inside the cavity of the housing portion.

13. The steering knuckle gearbox assembly of claim 8, wherein the axle frame has an aperture defined in the axle frame, the aperture extends between the vehicle end and the distal end and is sized to receive the drive axle through the aperture defined in the axle frame when the vehicle end of the axle frame is mounted to the vehicle frame.

14. The steering knuckle gearbox assembly of claim 8, further comprising a spacer removably attached to the vehicle end of the axle frame, the spacer having a predetermined thickness and being mounted between the vehicle end of the axle frame and the vehicle when the vehicle end of the axle frame is mounted to the vehicle.

15. The steering knuckle gearbox assembly of claim 8, wherein a king pin aperture is defined in the mating portion, the king pin aperture being sized to receive a king pin through the king pin aperture for pivotably mounting the mating portion to the distal end of the axle frame.

16. The steering knuckle gearbox assembly of claim 15, wherein:
the outer end of the input shaft terminates at a coupler,
the coupler is operatively connectable to the drive axle to be driven by the drive axle when the body is in any one of the range of angular positions between the first angular position and the second angular position, and
the coupler is positioned relative to the mating portion such that the steering axis passes through the coupler.

17. The steering knuckle gearbox assembly of claim 8, wherein:
the housing portion has an exterior side opposite the interior vehicle-facing side,
the steering knuckle gearbox assembly includes a wheel hub operatively connected to the output shaft to be driven by the output shaft,
the wheel hub is positioned on the exterior side of the housing portion, and
the wheel hub is structured to have a drive wheel mounted thereto.

18. The steering knuckle gearbox assembly of claim 17, wherein:
the wheel hub defines a cavity in the wheel hub,
at least one additional gear is disposed inside the cavity of the wheel hub,
the outer end of the output shaft extends into the cavity of the wheel hub, and
the at least one additional gear operatively connects the outer end of the output shaft to the wheel hub to drive the wheel hub at a second predetermined gear ratio.

19. A steerable track system for a vehicle, comprising:
a steering knuckle gearbox assembly having:
a body having,
a housing portion having a cavity defined in the housing portion, the housing portion having an interior vehicle-facing side and an exterior side opposite the interior vehicle-facing side,
a mating portion connected to the housing portion and positioned on the interior vehicle-facing side of the housing portion, the mating portion being structured, dimensioned and positioned to be pivotably mounted to a distal end of an axle frame so as to pivot about a steering axis between a first angular position and a second angular position, and
a mounting portion positioned relative to the body such that a steering link extending away from the vehicle is pivotably mountable to the mounting portion for actuating pivoting of the body about the steering axis between the first angular position and the second angular position;
an input shaft rotationally supported by the housing portion for rotation about an input axis defined by the input shaft, the input shaft having an inner end positioned inside the cavity of the housing portion and an outer end opposite the inner end, the outer end of the input shaft being connectable to a drive axle of the vehicle so as to be drivable by the drive axle when the body is in any one of a range of angular positions between the first angular position and the second angular position;
an output shaft rotationally supported by the housing portion for rotation about an output axis defined by the output shaft, the output axis being offset in height from the input axis, the output shaft having an inner end positioned inside the cavity of the housing portion and an outer end opposite to the inner end of the output shaft, the inner end of the output shaft being operatively connected to the inner end of the input shaft to be driven by the input shaft; and
a pivot axle connected to a bottom side of the body in a first position, the pivot axle defining a frame pivot axis that is parallel to the output axis;
a track system frame pivotably mounted on the pivot axle so as to be pivotable about the frame pivot axis, the track system frame being positioned below the body of the steering knuckle gearbox assembly;
a plurality of idler wheels rotationally supported by the track system frame;
a drive wheel positioned on the exterior side of the housing portion, the drive wheel being operatively connected to the output shaft to be driven by the output shaft; and
an endless track extending around the plurality of idler wheels and the drive wheel, the endless track being in driving engagement with the drive wheel to be driven by the drive wheel.

* * * * *